United States Patent
Shao et al.

(10) Patent No.: US 11,838,885 B2
(45) Date of Patent: *Dec. 5, 2023

(54) METHOD AND APPARATUS FOR TIMING ADVANCE ADJUSTMENT

(71) Applicant: Huawei Technologies Co., Ltd., Shenzhen (CN)

(72) Inventors: Hua Shao, Shenzhen (CN); Zhe Liu, Shanghai (CN); Huang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,466

(22) Filed: Nov. 14, 2022

(65) Prior Publication Data

US 2023/0140450 A1 May 4, 2023

Related U.S. Application Data

(63) Continuation of application No. 17/094,547, filed on Nov. 10, 2020, now Pat. No. 11,516,760, which is a
(Continued)

(30) Foreign Application Priority Data

May 11, 2018 (CN) .......................... 201810450341.7
Jul. 24, 2018 (CN) .......................... 201810820209.0

(51) Int. Cl.
*H04W 56/00* (2009.01)
*H04L 5/00* (2006.01)
*H04W 72/1268* (2023.01)

(52) U.S. Cl.
CPC ......... *H04W 56/0045* (2013.01); *H04L 5/001* (2013.01); *H04W 72/1268* (2013.01)

(58) Field of Classification Search
None
See application file for complete search history.

(56) References Cited

U.S. PATENT DOCUMENTS 11,109,338 B2 * 8/2021 Choi ...................... H04W 48/12
11,259,261 B2 * 2/2022 Yoon ................. H04W 56/0045
(Continued)

FOREIGN PATENT DOCUMENTS

CN          103327627 A     9/2013
CN          103327646 A     9/2013
(Continued)

OTHER PUBLICATIONS

3GPP TS 38.213 V15.1.0 (Mar. 2018); 3rd Generation Partnership Project; Technical Specification Group Radio Access Network; NR; Physical layer procedures for control (Release 15); 77 pages.
(Continued)

*Primary Examiner* — Anh Ngoc M Nguyen
(74) *Attorney, Agent, or Firm* — Slater Matsil, LLP

(57) ABSTRACT

This application provides a method and an apparatus for determining an effective time of a timing advance (TA). The method includes: determining a first subcarrier spacing from M subcarrier spacings, where the M subcarrier spacings are subcarrier spacings of L carriers used by a terminal device, and $L \geq M \geq 2$; and determining an effective time of a timing advance (TA) of each of the L carriers based on the first subcarrier spacing.

22 Claims, 4 Drawing Sheets

Related U.S. Application Data continuation of application No. PCT/CN2019/086459, filed on May 10, 2019.

(56) References Cited

U.S. PATENT DOCUMENTS

| | | | |
|---|---|---|---|
| 2013/0039195 | A1 | 2/2013 | Weng et al. |
| 2019/0313407 | A1 | 10/2019 | Tsai |
| 2020/0119898 | A1 | 4/2020 | Orsino et al. |
| 2020/0221508 | A1 | 7/2020 | Huang et al. |

FOREIGN PATENT DOCUMENTS

| | | | |
|---|---|---|---|
| CN | 107438041 | A | 12/2017 |
| CN | 107872417 | A | 4/2018 |
| CN | 108012329 | A | 5/2018 |
| CN | 109451586 | A | 3/2019 |
| WO | 2011124010 | A1 | 10/2011 |
| WO | 2019047766 | A1 | 3/2019 |

OTHER PUBLICATIONS

3GPP TS 38.214 V15.1.0 (Mar. 2018); 3rd Generation Partnership Project; Technical Specification Group Radio Access Network; NR; Physical layer procedures for data (Release 15); 77 pages.

3GPP TS 38.321 V15.1.0 (Mar. 2018); 3rd Generation Partnership Project; Technical Specification Group Radio Access Network; NR; Medium Access Control (MAC) protocol specification (Release 15), 67 pages.

3GPP TS 38.331 V15.1.0 (Mar. 2018); 3rd Generation Partnership Project;Technical Specification Group Radio Access Network; NR; Radio Resource Control (RRC) protocol specification (Release 15); 268 pages.

Huawei, HiSilicon, "Remaining issues on NR CA and DC", 3GPP TSG RAN WG 1 NR Ad Hoc Meeting #4, R1-1800021, Jan. 22-26, 2018, 13 pages, Vancouver, Canada.

Fujitsu, "Discussion on ambiguity about TA determination in case of multiple configured UL BWPs with different numerologies", 3GPP TSG RAN WG1 Meeting #92 , R1-1801891, Feb. 26-Mar. 2, 2018, 3 pages, Athens, Greece.

QUALCOMM Incorporated, "Remaining details on timing advance granularity and adjustment consideration", 3GPP TSG-RAN WG1 Meeting #92, R1-1802817, 26th Feb. 26-Mar. 2, 2018, 5 pages, Athens, Greece.

Huawei, HiSilicon, "Remaining issues on TA aspects", 3GPP TSG RAN WG1 #92b, R1-1803703, Apr. 16-20, 2018, 9 pages, Sanya, China.

MEDIATEK Inc.,"Remaining details on RACH procedure", 3GPP TSG RAN WG1 Meeting #92bis R1-1804047, Apr. 16-20, 2018, 12 pages, Sanya, China.

MOTOROLA Mobility et al., "Remaining details on random access procedure", 3GPP TSG RAN WG1 Meeting #92bis R1-1804954, Apr. 16-20, 2018, 5 pages, Sanya, China.

QUALCOMM Incorporated, "Summary of Remaining Details on RACH Procedure", 3GPP TSG-RAN WG1 92bis, R1-1805754, Apr. 16-Apr. 20, 2018, 33 pages, Sanya, China.

Ericsson, "Requirements for NR UE timing advance", 3GPP TSG-RAN WG4 Meeting NR#2 Ad Hoc, R4-1706716, Jun. 27-29, 2017, 4 pages, Qingdao, China.

* cited by examiner

METHOD AND APPARATUS FOR TIMING ADVANCE ADJUSTMENT

CROSS-REFERENCE TO RELATED APPLICATIONS

This application is a continuation of U.S. patent application Ser. No. 17/094,547, filed on Nov. 10, 2020, which is a continuation of International Application No. PCT/CN2019/086459, filed on May 10, 2019, which claims priority to Chinese Patent Application No. 201810450341.7, filed on May 11, 2018 and claims priority to Chinese Patent Application No. 201810820209.0, filed on Jul. 24, 2018. All of the afore-mentioned patent applications are hereby incorporated by reference in their entireties.

TECHNICAL FIELD

This application relates to the communications field, and more specifically, to a method and an apparatus for determining an effective moment of a timing advance (TA).

BACKGROUND

To ensure orthogonality of uplink transmission and avoid intra-cell interference, uplink signals from different terminal devices (for example: user equipment, UE) are required to arrive at a network device at substantially aligned times. Therefore, the network device sends a timing advance (TA) to the terminal device, and the terminal device adjusts, based on the received TA, a time for sending the uplink signal, to implement uplink timing synchronization between the terminal device and the network device.

There is a specific time interval between a start time of receiving a downlink signal by the terminal device and a time of transmitting an uplink signal by the terminal device, and different terminal devices have different time intervals. In a process of adjusting the TA, the terminal device first receives a TA adjustment command sent by the network device, and after a period of time, the terminal device applies a new TA until a new TA adjustment command is received. The terminal device may control a TA effective time by controlling the time interval.

Currently, because uplink (UL) resources have different subcarrier spacings (SCS), time intervals are different. Consequently, TA effective times of different UL carriers in a same timing advance group (TAG) are different. In addition, different TA effective times increase implementation complexity of the terminal device.

SUMMARY

This application provides a method and an apparatus for determining an effective moment of a timing advance (TA), to ensure uplink timing synchronization between a terminal device and a network device.

According to a first aspect, a communication method is provided, including: determining a first subcarrier spacing from M subcarrier spacings, where the M subcarrier spacings are subcarrier spacings corresponding to L carriers used by a terminal device, and L≥M≥2; and determining an effective moment of a timing advance (TA) of each of the L carriers based on the first subcarrier spacing.

A network device sends configuration information to the terminal device, to indicate an uplink subcarrier spacing, and sends a TA adjustment command to the terminal device. The terminal device receives the TA adjustment command sent by the network device, where the TA adjustment command includes a TA adjustment amount; and the terminal device determines a new timing advance based on a current timing advance (TA) and the TA adjustment amount.

A base station determines a timing advance of each user equipment (UE) by measuring an uplink signal transmitted by the UE, and notifies the UE of the timing advance. For a terminal device, there is a specific time interval from a moment at which the terminal device receives a downlink signal to a moment at which a TA starts to take effect. The time interval is referred to as a first time interval N in this application. The first time interval N may be defined as K slots, and total duration of the first time interval N includes four parts of duration shown in FIG. 4: $N_1$, $N_2$, $L_2$, and $TA_{max}$.

A mobile communications system supports a plurality of subcarrier spacings (for example, the subcarrier spacings are applicable to different service types or working frequencies), and symbols of different subcarrier spacings respectively correspond to different cyclic prefix (CP) lengths. Correspondingly, different subcarrier spacings correspond to different anti-latency influence performance. Therefore, the UE uses different timing advances in different scenarios, so that diversified requirements of a 5G mobile communications system for uplink synchronization can be met. Currently, in carrier resources, different subcarrier spacings include 15 kHz, 30 kHz, 60 kHz, and 120 kHz, and may have more possibilities in the future. It should be understood that this application includes these subcarrier spacings but is not limited thereto.

In a case of different UL subcarrier spacings, absolute lengths of $N_1$, $N_2$, and $TA_{max}$ are different. Consequently, TA effective times of different UL carriers in a same TAG are different. Different TA effective times increase implementation complexity of the terminal device, and do not conform to a definition of a same TAG.

An embodiment of this application provides a method for determining a TA effective time. A time interval N before the TA effective time is determined, and it is ensured that for a same terminal device, the time interval N is consistent when a plurality of UL subcarrier spacings are included. In this way, in a same TAG, TA effective times of the terminal device are consistent, so that uplink timing synchronization between the terminal device and the network device can be ensured.

Optionally, the terminal device determines the first subcarrier spacing from the M subcarrier spacings. Specific methods for determining the first subcarrier spacing are listed as follows:

Case 1

For the L uplink (UL) carriers, $N_1$ and $N_2$ are determined with reference to a minimum UL subcarrier spacing. For example, if L=2 uplink (UL) carriers are configured for the UE, and subcarrier spacings are respectively 15 kHz and 30 kHz, $N_1$ and $N_2$ are calculated based on 15 kHz.

Case 2

For the L uplink (UL) carriers, $N_1$ and $N_2$ are determined with reference to a maximum UL subcarrier spacing. For example, if L=2 uplink (UL) carriers are configured for the UE, and subcarrier spacings are respectively 15 kHz and 30 kHz, $N_1$ and $N_2$ are calculated based on 30 kHz.

Case 3

For the L uplink (UL) carriers, $TA_{max}$ is determined with reference to a minimum UL subcarrier spacing. For example, if L=2 uplink (UL) carriers are configured for the UE, and subcarrier spacings are respectively 15 kHz and 30 kHz, $TA_{max}$ is calculated based on 15 kHz.

Case 4

For the L uplink (UL) carriers, $TA_{max}$ is determined with reference to a maximum UL subcarrier spacing. For example, if L=2 uplink (UL) carriers are configured for the UE, and subcarrier spacings are respectively 15 kHz and 30 kHz, $TA_{max}$ is calculated based on 30 kHz.

Case 5

For the L uplink (UL) carriers, $N_1$, $N_2$, and $TA_{max}$ are determined with reference to a minimum UL subcarrier spacing. For example, if L=2 uplink (UL) carriers are configured for the UE, and subcarrier spacings are respectively 15 kHz and 30 kHz, a time interval is calculated based on 15 kHz.

Case 6

For the L uplink (UL) carriers, $N_1$, $N_2$, and $TA_{max}$ are determined with reference to a maximum UL subcarrier spacing. For example, if L=2 uplink (UL) carriers are configured for the UE, and subcarrier spacings are respectively 15 kHz and 30 kHz, a time interval is calculated based on 30 kHz.

Case 7

For the L uplink (UL) carriers, $N_1$ and $N_2$ are determined with reference to a minimum UL subcarrier spacing, and $TA_{max}$ is determined with reference to a maximum UL subcarrier spacing.

For example, if L=2 uplink (UL) carriers are configured for the UE, and subcarrier spacings are respectively 15 kHz and 30 kHz, during calculation of a time interval, $N_1$ and $N_2$ are determined based on 15 kHz, and $TA_{max}$ is determined based on 30 kHz.

Case 8

For the L uplink (UL) carriers, $N_1$ and $N_2$ are determined with reference to a maximum UL subcarrier spacing, and $TA_{max}$ is determined with reference to a minimum UL subcarrier spacing.

For example, if L=2 uplink (UL) carriers are configured for the UE, and subcarrier spacings are respectively 15 kHz and 30 kHz, during calculation of a time interval, $N_1$ and $N_2$ are determined based on 30 kHz, and $TA_{max}$ is determined based on 15 kHz.

Case 9

For the L uplink (UL) carriers, $N_1$ and $N_2$ are determined with reference to a minimum UL subcarrier spacing, and $TA_{max}$ is determined with reference to a minimum value in a subcarrier spacing in the uplink (UL) carriers and a subcarrier spacing of a carrier resource used to transmit an Msg3, that is, $\mu=\min(\text{Msg3 SCS}, \text{UL SCS})$.

Case 10

For the L uplink (UL) carriers and subcarrier spacings of T messages 3 (Msg3) in a random access process, N1 and N2 are determined with reference to a minimum UL subcarrier spacing, and $TA_{max}$ is determined with reference to a maximum/minimum subcarrier spacing, that is, $\mu=\min(\max(\text{Msg3 SCSs}), \text{UL SCS})$, or $\mu=\min(\min(\text{Msg3 SCSs}), \text{UL SCS})$.

For example, if the base station configures random access resources on the UL and an SUL, and subcarrier spacings of the Msg3 of the base station are respectively 15 kHz or 30 kHz, $\mu$ corresponding to $TA_{max}$ is determined with reference to the minimum subcarrier spacing 15 kHz, or $\mu$ is determined with reference to the maximum subcarrier spacing 30 kHz.

Optionally, the UL SCSs of L uplink (UL) carriers may be SCSs of all bandwidth pails (BWPs) in an active state, or subcarrier spacings of a plurality of BWPs configured for the terminal device, or subcarrier spacings of all BWPs.

It should be understood that, in a random access process, a subcarrier spacing of an uplink carrier resource for transmitting the Msg3 may be 15 kHz. After the random access process is completed, a subcarrier spacing for transmitting an uplink resource may be reconfigured. For example, a subcarrier spacing of an allocated carrier resource may be 30 kHz or 60 kHz. Therefore, in consideration of impact of random access, impact of the subcarrier spacing of the Msg3 is considered in a process of determining $TA_{max}$ herein. In addition, because a plurality of uplink carriers may each have a corresponding random access resource, the uplink carriers may correspond to different subcarrier spacings of the message 3. For example, an uplink (UL) carrier and a supplementary uplink (supplementary UL, SUL) carrier are configured for the UE. The message 3 may have two subcarrier spacings, for example, 15 kHz and 30 kHz respectively. Therefore, in the process of determining $TA_{max}$, impact of a plurality of subcarrier spacings of the Msg3 is also taken into consideration.

For example, an uplink (UL) subcarrier spacing used by the UE is different from that of the Msg3. To support a maximum coverage range, $TA_{max}$ needs to be a minimum value in the subcarrier spacing of the Msg3 and the configured UL subcarrier spacing (SCS). For example, if L=2 uplink (UL) carriers are configured for the UE, subcarrier spacings are respectively 60 kHz and 30 kHz, and in a random access process, a subcarrier spacing (SCS) of a carrier resource for transmitting the Msg3 is 15 kHz, during calculation of a time interval, $N_1$ and $N_2$ are determined based on 30 kHz, and $TA_{max}$ is determined based on 15 kHz.

Ten possible cases of the first subcarrier spacing used for determining $N_1$, $N_2$, and $TA_{max}$ are listed above. It should be understood that the foregoing cases are merely examples instead of limitations. In various processes of determining the first subcarrier spacing, there may be more cases of combining the first subcarrier spacings used for determining $N_1$, $N_2$, and $TA_{max}$. This application includes these cases but is not limited thereto.

Optionally, in a process of determining the first subcarrier spacing, the terminal device may set a first threshold, and determine the first threshold as the first subcarrier spacing, to participate in subsequent determining of the effective moment of the TA.

Optionally, the foregoing method provided in this application may alternatively be used in combination with the prior art. For example, a minimum value is obtained from the determined first subcarrier spacing of the uplink carrier resource and a subcarrier spacing of a downlink carrier resource, to obtain a subcarrier spacing. Details are not described herein. It should be understood that this application includes these but is not limited thereto.

With reference to the first aspect, in some implementations of the first aspect, the determining an effective moment of a timing advance (TA) of each of the L carriers based on the first subcarrier spacing includes: determining, based on the first subcarrier spacing, a first time interval corresponding to a first carrier in the L carriers, where the first time interval is a time interval between a receiving moment of a downlink signal and an effective moment of a TA; and determining the effective moment of the timing advance (TA) of each of the L carriers based on the first time interval.

Optionally, the terminal device determines, based on the first subcarrier spacing, the first time interval corresponding to the first carrier in the L carriers, where the first time interval is the time interval between the receiving moment of the downlink signal and the effective moment of the TA; and then determines the effective moment of the timing advance (TA) of each of the L carriers based on the first time interval.

For example, when a subcarrier spacing of a downlink DL is 15 kHz, a subcarrier spacing of an uplink (UL) carrier is 30 kHz, and $\mu=\min(\mu_{DL}, \mu_{UL})=\min(15 \text{ kHz}, 30 \text{ kHz})=15$ kHz, it is learned according to Formula (1) that the first time interval $N=\text{ceil}(N_1+N_2+L_2+TA_{max})=\text{ceil}(13 \text{ symbols}+10 \text{ symbols}+0.5 \text{ ms}+2 \text{ ms})=\text{ceil}(58 \text{ symbols})=5 \text{ ms}$.

With reference to the first aspect and the foregoing implementations, in some possible implementations, the first time interval includes one or more of first duration, second duration, and third duration, and the determining, based on the first subcarrier spacing, a first time interval corresponding to a first carrier in the L carriers includes:

determining the first duration based on the first subcarrier spacing, where the first duration is duration required for processing a downlink signal; and/or determining the second duration based on the first subcarrier spacing, where the second duration is duration required for preparing an uplink signal; and/or determining the third duration based on the first subcarrier spacing, where the third duration is maximum duration that is allowed to be indicated by a 12-bit or 6-bit timing advance command (TAC) when the third duration is determined based on the first subcarrier spacing.

Optionally, the first time interval may be determined with reference to a maximum subcarrier spacing or a minimum subcarrier spacing. For example, if the maximum subcarrier spacing is 30 kHz, and the minimum subcarrier spacing is 15 kHz, the first time interval determined according to the foregoing method is 5 ms. When the first time interval is determined with reference to the subcarrier spacing of 15 kHz, 5 ms is equivalent to 5 slots. To be specific, for an uplink carrier of 15 kHz, a TA is applied starting from a sixth slot. When the first time interval is determined with reference to the subcarrier spacing of 30 kHz, 5 ms is equivalent to 10 slots. To be specific, for an uplink carrier of 30 kHz, a TA is applied starting from an eleventh slot.

Optionally, when the first time interval is determined with reference to the maximum subcarrier spacing, for a small subcarrier spacing, the first time interval cannot be integral slots, and a rounding up operation needs to be performed on the first time interval. The rounding up operation means selecting a value that is greater than the original first time interval and that is a minimum integer multiple of slot duration corresponding to the minimum subcarrier spacing. For example, the first time interval determined according to the foregoing method is 2.5 ms, and includes two carriers (15 kHz and 30 kHz). Because 2.5 ms is not an integer multiple of a slot corresponding to the subcarrier spacing of 15 kHz, the first time interval of 2.5 ms needs to be rounded up first based on a step of 15 kHz, that is, 3 ms. 3 ms corresponds to 3 slots (15 kHz) and 6 slots (30 kHz). Therefore, for the subcarrier spacing of 15 kHz, a new TA is applied starting from a fourth slot, and for the subcarrier spacing of 30 kHz, a new TA is applied starting from a seventh slot.

It should be understood that 12 bits herein are merely an example instead of a limitation, and another possible value less than 12 bits, for example, 6 bits, may also be used.

It should be understood that the duration required for processing a downlink signal is related to a downlink signal configuration such as a demodulation reference signal configuration, and/or a downlink signal subcarrier spacing, and/or a UE processing capability. It should be understood that the duration required for preparing an uplink signal is related to an uplink signal subcarrier spacing and/or a UE processing capability.

It should be understood that in the listed processes of determining the first time interval herein, a sum may be obtained according to Formula (i) by separately determining duration of $N_1$, $N_2$, $L_2$, and $TA_{max}$, to obtain the first time interval N. Alternatively, in this embodiment of this application, only duration of one or more of $N_1$, $N_2$, $L_2$, and $TA_{max}$ may be determined. In a technology development process, it is possible that only duration of at least one of $N_1$, $N_2$, $L_2$, and $TA_{max}$ needs to be determined, and the first time interval N may be obtained by using a specific relationship. Herein, a method for determining duration of any one or more of $N_1$, $N_2$, $L_2$, and $TA_{max}$ by using the method provided in this application falls within the protection scope of this application.

With reference to the first aspect and the foregoing implementations, in some possible implementations, when at least two of the L carriers are used for a random access process, and a carrier used to transmit a message Msg3 includes at least two subcarrier spacings, before the determining the third duration based on the first subcarrier spacing, the method further includes: determining the first subcarrier spacing based on the at least two subcarrier spacings.

With reference to the first aspect and the foregoing implementations, in some possible implementations, the first time interval further includes fourth duration, and the fourth duration is duration determined by the terminal device based on a cell reuse mode; and/or the fourth duration is duration determined by the terminal device based on a frequency range within which the terminal device or a network device works.

With reference to the first aspect and the foregoing implementations, in some possible implementations, the method further includes: determining a first mapping relationship, where the first mapping relationship includes a one-to-one mapping relationship between a plurality of subcarrier spacings and a plurality of pieces of duration. The determining an effective moment of a timing advance (TA) of each of the L carriers based on the first subcarrier spacing includes: determining, based on the first mapping relationship, a first time interval corresponding to the first subcarrier spacing; and determining the effective moment of the timing advance (TA) of each of the L carriers based on the first time interval. Specifically, the terminal device learns, based on a network device configuration, subcarrier spacings of all uplink (UL) carriers in a TAG; and then, receives a MAC-CE that includes a TA adjustment command and that is delivered by the network device, and determines an effective moment of a TA; and then, can use a new TA included in the MAC-CE.

After receiving the MAC-CE that includes the TA adjustment command, the terminal device determines the first time interval based on a minimum or maximum uplink subcarrier spacing in a same TAG. For example, the terminal device may determine the first time interval based on a preset function.

With reference to the first aspect and the foregoing implementations, in some possible implementations, the first subcarrier spacing is a minimum subcarrier spacing among the M subcarrier spacings, or the first subcarrier spacing is a maximum subcarrier spacing among the M subcarrier spacings.

It should be understood that the first subcarrier spacing may be determined based on one or more of a maximum/ minimum value among all uplink subcarrier spacings, or a maximum/minimum value among subcarrier spacings of all bandwidth parts in an active state, or a maximum/minimum value among subcarrier spacings of a plurality of BWPs configured for the terminal device, or a maximum/minimum value among subcarrier spacings of all BWPs. Alternatively, the first subcarrier spacing may be fixedly set to a subcarrier spacing, for example, for a low frequency (a working frequency that is less than or equal to 6 GHz), the first subcarrier spacing may be fixedly set to 15 kHz.

Optionally, in a process of determining the first subcarrier spacing, the terminal device may set a first threshold, and determine the first threshold as the first subcarrier spacing, to participate in subsequent determining of the effective moment of the TA.

With reference to the first aspect and the foregoing implementations, in some possible implementations, after the determining an effective moment of a timing advance (TA) of each of the L carriers based on the first subcarrier spacing, the method further includes: sending uplink information based on the timing advance (TA).

The foregoing describes a detailed process in which the terminal device determines the effective moment of the timing advance (TA). After determining the first time interval N, the terminal device can determine the effective moment of the TA by adding duration represented by the first time interval N to the receiving moment of the downlink signal. After determining the effective moment of the timing advance (TA) of each of the L carriers, the terminal device may send the uplink information based on the timing advance (TA).

According to a second aspect, a communications apparatus is provided, including: a determining unit, configured to determine a first subcarrier spacing from M subcarrier spacings, where the M subcarrier spacings are subcarrier spacings corresponding to L carriers used by a terminal device, and L≥M≥2; and the determining unit is further configured to determine an effective moment of a timing advance (TA) of each of the L carriers based on the first subcarrier spacing.

With reference to the second aspect, in some possible implementations, the determining unit is further configured to: determine, based on the first subcarrier spacing, a first time interval corresponding to a first carrier in the L carriers, where the first time interval is a time interval between a receiving moment of a downlink signal and an effective moment of a TA; and determine the effective moment of the timing advance (TA) of each of the L carriers based on the first time interval.

With reference to the second aspect and the foregoing implementations, in some possible implementations, the first time interval includes one or more of first duration, second duration, and third duration, and the determining unit is further configured to: determine the first duration based on the first subcarrier spacing, where the first duration is duration required for processing a downlink signal; and/or determine the second duration based on the first subcarrier spacing, where the second duration is duration required for preparing an uplink signal; and/or determine the third duration based on the first subcarrier spacing, where the third duration is maximum duration that is allowed to be indicated by a 12-bit or 6-bit timing advance command (TAC) when the third duration is determined based on the first subcarrier spacing.

With reference to the second aspect and the foregoing implementations, in some possible implementations, when at least two of the L carriers are used for a random access process, and a carrier used to transmit a message Msg3 includes at least two subcarrier spacings, before determining the third duration based on the first subcarrier spacing, the determining unit is further configured to determine the first subcarrier spacing based on the at least two subcarrier spacings.

With reference to the second aspect and the foregoing possible implementations, in some possible implementations, the first time interval further includes fourth duration, and the fourth duration is duration determined by the terminal device based on a cell reuse mode; and/or the fourth duration is duration determined by the terminal device based on a frequency range within which the terminal device or a network device works.

With reference to the second aspect and the foregoing implementations, in some possible implementations, the determining unit is further configured to: determine a first mapping relationship, where the first mapping relationship includes a one-to-one mapping relationship between a plurality of subcarrier spacings and a plurality of pieces of duration; determine, based on the first mapping relationship, a first time interval corresponding to the first subcarrier spacing; and determine the effective moment of the timing advance (TA) of each of the L carriers based on the first time interval.

With reference to the second aspect and the foregoing implementations, in some possible implementations, the first subcarrier spacing is a minimum subcarrier spacing among the M subcarrier spacings, or the first subcarrier spacing is a maximum subcarrier spacing among the M subcarrier spacings.

With reference to the second aspect and the foregoing implementations, in some possible implementations, the apparatus further includes a sending unit, configured to send uplink information based on the timing advance (TA).

According to a third aspect, a communications apparatus is provided. The communications apparatus has a function of implementing behaviors of the terminal device in any one of the first aspect and the possible implementation method designs of the first aspect. The function may be implemented by using hardware, or may be implemented by executing corresponding software by hardware. The hardware or the software includes one or more modules corresponding to the function. The module may be software and/or hardware.

With reference to the third aspect, in some possible implementations, a structure of the communications apparatus includes a memory and a processor. The processor is configured to be coupled to the memory to execute an instruction in the memory, to implement the method in any one of the first aspect and the possible implementation method designs of the first aspect. The memory is configured to store a program instruction and data.

According to a fourth aspect, a computer readable storage medium is provided and is configured to store a computer program. The computer program includes an instruction that is used to execute the method in any one of the first aspect and the possible implementation method designs of the first aspect.

According to a fifth aspect, a computer program product is provided. The computer program product includes a computer program code, and when the computer program code runs on a computer, the computer performs the communication method in any one of the first aspect and the possible implementation method designs of the first aspect.

According to a sixth aspect, a chip system is provided. The chip system includes a processor, configured to support a network device in implementing functions in the foregoing aspects, for example, generating, receiving, determining, sending, or processing data and/or information in the foregoing method. In a possible design, the chip system further includes a memory, and the memory is configured to store a program instruction and data that are necessary for a terminal device. The chip system may include a chip, or may include a chip and another discrete device.

DETAILED DESCRIPTION OF ILLUSTRATIVE EMBODIMENTS

Figure 1:
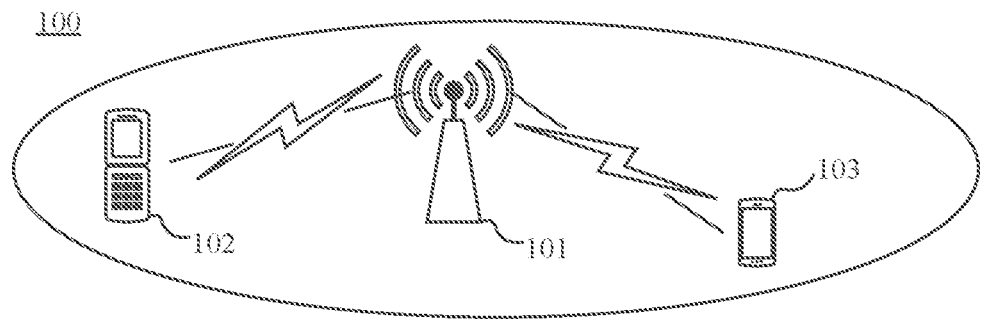
FIG. 1 is a schematic diagram of an example wireless communications system according to an embodiment of this application.

The following describes technical solutions of this application with reference to the accompanying drawings.

Manners, cases, categories, and embodiment division in the embodiments of this application are merely for ease of description, and should not constitute a special limitation. Various manners, categories, cases, and features in the embodiments may be combined, provided that they do not conflict with each other.

It should be noted that, in the embodiments of this application, a "protocol" may be a standard protocol in the communications field, for example, may include an LTE protocol, an NR protocol, and a related protocol applied to a future communications system. This application includes these protocols but is not limited thereto.

It should be further noted that, in the embodiments of this application, "predefined" may be implemented by prestoring corresponding code or a corresponding table in a device (for example, a terminal device and a network device), or may be implemented in another manner that can be used to indicate related information. A specific implementation is not limited in this application. For example, "predefined" may be "defined in a protocol".

It should be further noted that, in the embodiments of this application, nouns "network" and "system" are usually used interchangeably, but a person skilled in the art can understand their meanings. Information, signal, message, and channel may be used interchangeably sometimes. It should be noted that when differences therebetween are not emphasized, meanings expressed by information, signal, message, and channel are consistent. "Of (of)", and "corresponding" may be used interchangeably sometimes. It should be noted that when differences therebetween are not emphasized, meanings expressed by "of" and "corresponding" are consistent.

It should be further noted that, in the embodiments of this application, "report" and "feed back" are usually used interchangeably, but a person skilled in the art can understand their meanings. For the terminal device, both reporting CSI and feeding back CSI may substantially be sending CSI through a physical uplink channel. Therefore, in the embodiments of this application, when differences therebetween are not emphasized, meanings to be expressed by "report" and "feed back" are consistent.

It should be further noted that the term "and/or" describes an association relationship between associated objects and denotes that three relationships may exist. For example, A and/or B may represent the following three cases: Only A exists, both A and B exist, and only B exists. The character "/" generally indicates an "or" relationship between the associated objects.

The technical solutions of the embodiments of this application may be applied to various communications systems, for example, a long term evolution (LTE) system, an LTE frequency division duplex (FDD) system, an LTE time division duplex (TDD) system, a 5th generation (5G) mobile communications system or a new radio (NR) communications system, and a future mobile communications system.

For ease of understanding of the embodiments of this application, first, a communications system shown in FIG. 1 is used as an example to describe in detail a communications system applicable to the embodiments of this application. FIG. 1 is a schematic diagram of a wireless communications system 100 applicable to an embodiment of this application. As shown in FIG. 1, the wireless communications system 100 may include one or more network devices, for example, a network device 101 shown in FIG. 1. The wireless communications system 100 may further include one or more terminal devices, for example, a terminal device #1 102 and a terminal device #2 103 shown in FIG. 1. The wireless communications system 100 may support coordinated multipoint transmission/reception (CoMP). To be specific, a plurality of cells or a plurality of network devices may coordinate with each other to participate in data transmission of a terminal device or jointly receive data sent by a terminal device; or a plurality of cells or a plurality of network devices perform coordinated scheduling or coordinated beamforming. The plurality of cells may belong to a same network device or different network devices, and may be selected based on a channel gain or path loss, received signal strength, a signal receiving instruction, or the like.

It should be understood that the network device in the wireless communications system may be any device that has a wireless transceiver function or a chip that may be disposed in the device. The device includes but is not limited to a base station, an evolved NodeB (eNB), a home eNodeB, an access point (AP) in a wireless fidelity (WIFI) system, a wireless relay node, a wireless backhaul node, a transmission point (TP) or a transmission and reception point (TRP), and the like, or may be a gNB in an NR system, or may be a component or a part of a device that forms a base station, such as a central unit (CU), a distributed unit (DU), or a baseband unit (BBU). It should be understood that, a specific technology and a specific device form used by a wireless access network device are not limited in this embodiment of this application. In this application, the wireless access network device is referred to as a network device for short. If no special description is provided, all network devices in this application mean the wireless access network device. In this application, the network device may be a network device, or may be a chip that is applied to a network device to implement a wireless communication processing function.

In some deployments, the gNB may include a CU and a DU. The gNB may further include a radio frequency unit (RFU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information of the RRC layer eventually becomes information of the PHY layer, or is converted from information of the PHY layer. Therefore, in this architecture, it may also be considered that higher layer signaling, such as RRC layer signaling or PDCP layer signaling, is sent by the DU or sent by the DU and the RU. It may be understood that the network device may be a CU node, a DU node, or a device including a CU node and a DU node. In addition, the CU may be classified into a network device in an access network RAN, or the CU may be classified into a network device in a core network CN. This is not limited herein.

It should also be understood that the terminal device in the wireless communications system may also be referred to as a terminal, user equipment (UE), a mobile station (MS), a mobile terminal (MT), or the like. The terminal device in this embodiment of this application may be a mobile phone, a tablet computer, a computer with a wireless transceiver function, or may be a wireless terminal applied to scenarios such as virtual reality (VR), augmented reality (AR), industrial control, self driving, remote medical, a smart grid, transportation safety, a smart city, and a smart home. In this application, the foregoing terminal device and the chip that can be applied to the terminal device are collectively referred to as a terminal device. It should be understood that a specific technology and a specific device form used by the terminal device are not limited in this embodiment of this application.

Optionally, in the communications system wo shown in FIG. 1, the network device may be a serving network device. The serving network device may be a network device that provides at least one service in an RRC connection, non-access stratum (NAS) mobility management, and security input for the terminal device by using a wireless air interface protocol. Optionally, the network device may be a coordinated network device. The serving network device may send control signaling to the terminal device, and the coordinated network device may send data to the terminal device. Alternatively, the serving network device may send control signaling to the terminal device, and the servicing network device and the coordinated network device may send data to the terminal device. Alternatively, both the serving network device and the coordinated network device may send control signaling to the terminal device, and both the serving network device and the coordinated network device may send data to the terminal device. Alternatively, the coordinated network device may send control signaling to the terminal device, and at least one of the serving network device and the coordinated network device may send data to the terminal device. Alternatively, the coordinated network device may send control signaling and data to the terminal device. This is not specially limited in this embodiment of this application.

It should be understood that, FIG. 1 schematically shows the network device and the terminal device merely for ease of understanding. However, this should not constitute any limitation on this application. The wireless communications system may further include more or fewer network devices, or may include more terminal devices. Network devices that communicate with different terminal devices may be a same network device, or may be different network devices. Network devices that communicate with different terminal devices may have a quantity the same as or different from that of the terminal devices. This application includes these but is not limited thereto.

The following uses a general interaction process between one terminal device and one network device as an example to describe this embodiment of this application in detail. The terminal device may be any terminal device in a wireless communications system that has a wireless connection relationship with one or more network devices. It may be understood that any terminal device in the wireless communications system may implement wireless communication based on a same technical solution, and the following uses UE to represent a terminal device and uses gNB to identify a base station. This application includes these but is not limited thereto.

To facilitate understanding of the embodiments of this application, the following briefly describes several nouns or terms in this application.

1. Timing advance group (TAG): A group of cells configured by a network device by using radio resource control (RRC) signaling. To be specific, the network device configures a timing advance (TA) for a cell, and a TAG is formed when a plurality of cells have a same TA. For uplink carriers of the cells, a same uplink sending timing advance (TA) is used.

2. Timing Advance (TA)

A signal is transmitted in space with a latency, and the TA is used to represent a distance between the terminal device and an antenna port of the network device. To ensure orthogonality of uplink transmission processes of different terminal devices, and to ensure time synchronization on a base station side, that is, to ensure that uplink signals of different UEs arrive at the base station at an expected time, the communications system may use an uplink timing advance mechanism, and the UE sends uplink information based on a timing advance. For the UE, the timing advance is essentially a negative offset between a start moment of a downlink subframe and a start moment of an uplink subframe. By properly controlling an offset of each UE, the base station may control times at which uplink signals from different UEs arrive at the base station. UE that is relatively close to the base station may send uplink information based on a relatively small timing advance. UE that is relatively far away from the base station needs to send uplink information based on a relatively large timing advance because a signal has a relatively large transmission latency.

In a TAG, the network device configures a same timing advance (TA) for one or more cells, and the network device adjusts the TA based on information such as a location and a distance of the terminal device. It should be understood that the network device may perform adjustment based on a specific period, or the network device may perform adjustment based on information such as a location and a distance of the terminal device. This application includes these but is not limited thereto.

The terminal device receives a TA adjustment command sent by the network device, and the TA adjustment command includes a TA adjustment amount. The terminal device determines a new timing advance based on a timing advance (TA) of a current cell and the newly received TA adjustment amount, and sends uplink information based on the new timing advance.

Figure 2:
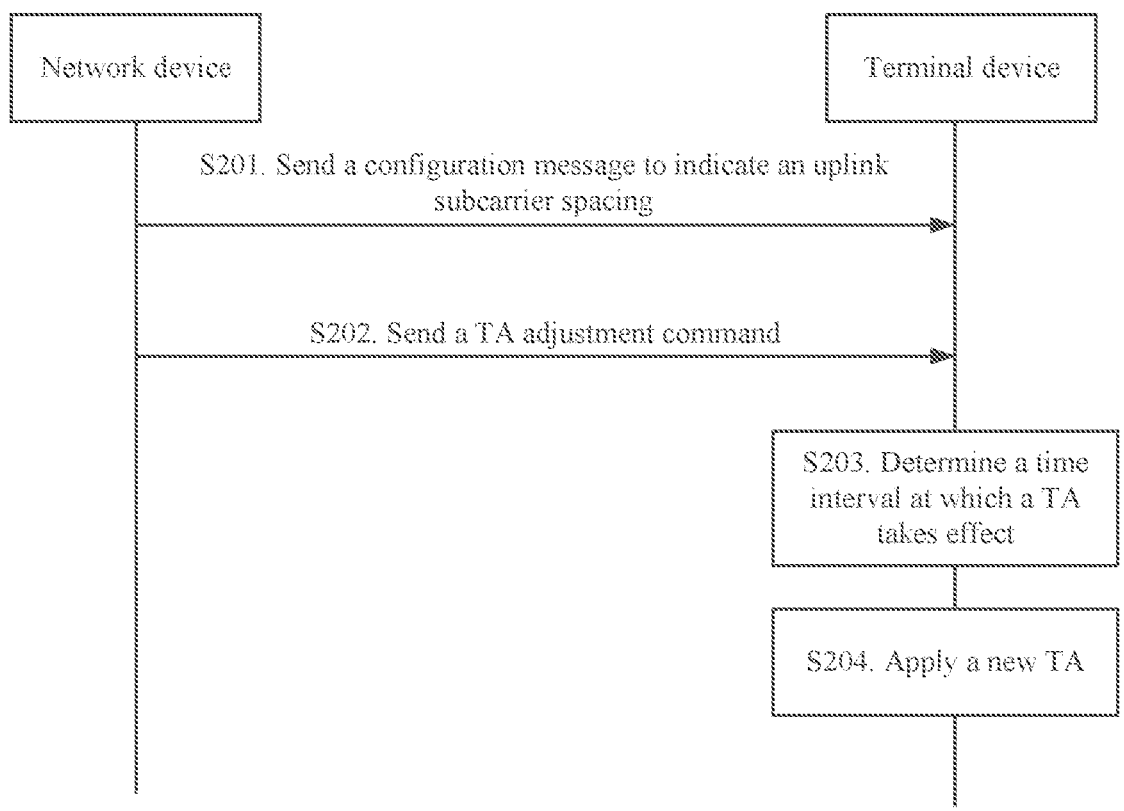
FIG. 2 is a schematic diagram of interaction between a terminal device and a network device in a TA adjustment process.

FIG. 2 is a schematic diagram of interaction between a terminal device and a network device in a TA adjustment process. As shown in FIG. 2, the TA adjustment process of the terminal device includes S201 to S205.

S201. The network device sends configuration information to the terminal device, to indicate an uplink subcarrier spacing.

S202. The network device sends a TA adjustment command to the terminal device.

S203. The terminal device receives the TA adjustment command sent by the network device, and determines a time interval at which a TA takes effect.

S204. After a period of time, apply a new TA, and apply the new TA in a subsequent slot, until a new TA adjustment command is received.

It should be understood that, in an actual TA adjustment process, the terminal device may perform some or all of the steps. This embodiment of this application is not limited thereto.

Figure 3:
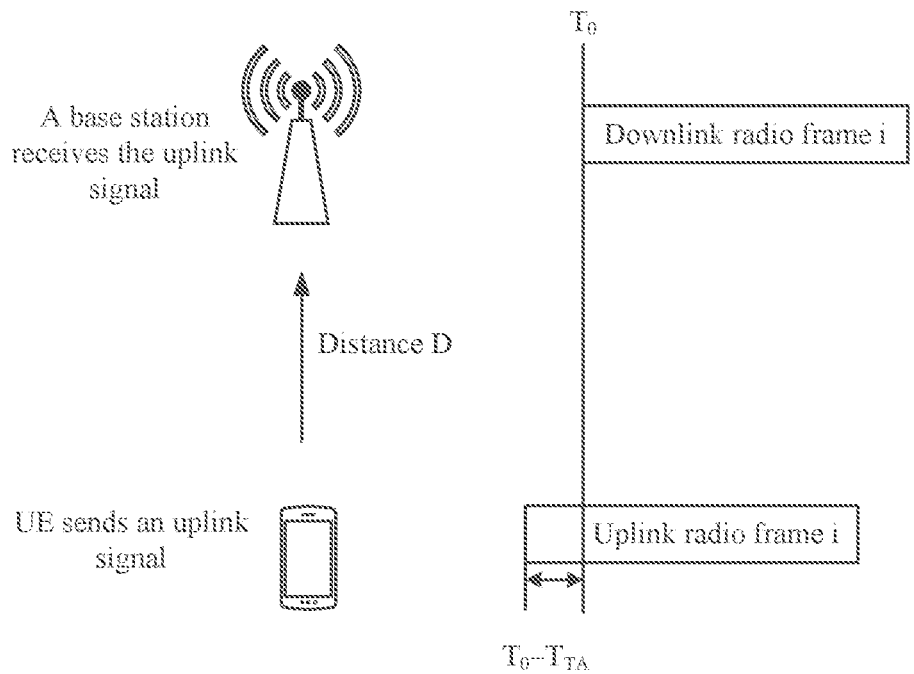
FIG. 3 is a schematic diagram in which a terminal device sends uplink information based on a timing advance (TA)

The base station notifies UE of a timing advance by using a timing advance command (TAC), and different UEs correspond to different timing advances. FIG. 3 is a schematic diagram in which UE sends uplink information based on a timing advance. In FIG. 3, if a transmission distance of a signal between the UE and the base station is D, and the base station expects to receive, at a moment $T_0$, an uplink signal sent by the UE, the UE needs to send the uplink information at the moment $T_0$-$T_{TA}$. TA represents a timing advance, a value of TA is D/c, and c represents a transmission rate of an electromagnetic wave. Because the UE has mobility, the transmission distance D of the signal between the UE and the base station also varies. Therefore, the UE needs to constantly adjust a value of the timing advance, to ensure that an error between a moment at which the uplink signal arrives at the base station and the moment at which the base station expects the uplink signal to arrive at the base station is within an acceptable range.

The base station determines a timing advance of each UE by measuring an uplink signal transmitted by the UE. Theoretically, the base station may measure the timing advance based on any uplink signal sent by the UE, and the base station may notify the UE of the timing advance in the following two manners.

Manner 1

In a random access process, the base station may notify the UE of the timing advance (TA) by using a TAC field of a random access response (RAR). In this case, the base station determines the timing advance (TA) by measuring a preamble sequence sent by the UE. A size of the TAC field of the RAR may be, for example, 11 bits, and a range of a corresponding timing advance coefficient is 0 to 1282. For random access, a value of a current timing advance is obtained by multiplying the timing advance coefficient by $16T_s$, $16T_s$ is a time length, and in an LTE system, $T_s$=1/(15000×2048) seconds.

Manner 2

In a radio resource control connected mode, the base station may send a timing advance command media access control control element (TAC MAC CE) to the UE.

The UE is in uplink synchronization with the base station in a random access process, but a communication environment of the UE may vary with time, and consequently a timing advance in the random access process is no longer applicable to a new communication environment. For example:

a transmission latency between UE that is moving at a high speed and the base station may change greatly in a short period of time;

a current transmission path disappears and is switched to a new communication path, and a transmission latency of the new communication path changes greatly relative to the original communication path;

the UE has a crystal oscillator offset, and an offset accumulated in a long period of time may cause an uplink timing error; and UE movement causes Doppler frequency shift.

Therefore, the UE needs to constantly update the timing advance of the UE.

Figure 4:
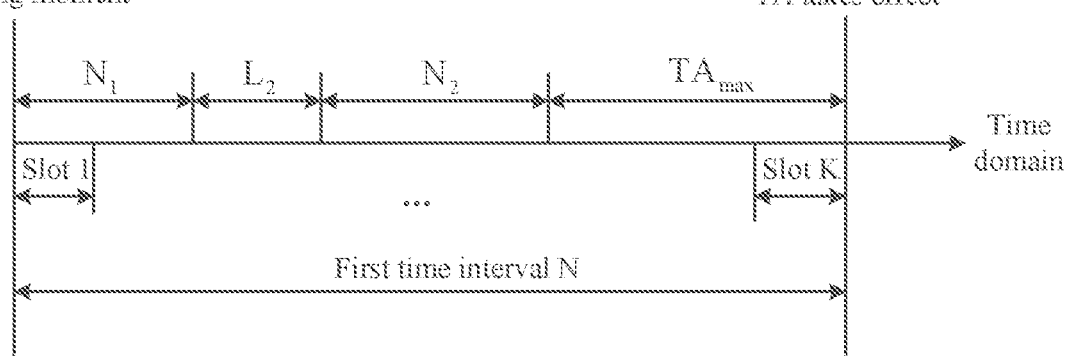
FIG. 4 is a schematic diagram of an example effective moment of a TA according to an embodiment of this application.

FIG. 4 is a schematic diagram of an effective moment of a TA. Currently, in NR, for a terminal device, there is a specific time interval from a moment at which the terminal device receives a downlink signal to a moment at which a TA starts to take effect. The time interval is referred to as a first time interval N in this application. The first time interval N may be defined as K slots (slots), and total duration of the first time interval N includes four parts of duration shown in the figure: $N_1$, $N_2$, $L_2$, and $TA_{max}$ that may be represented as:

$$N=\text{ceil}(N_1+N_2+L_2+TA_{max}) \quad (1)$$

In Formula (1), ceil represents rounding up, and $N_1$, $N_2$, and $TA_{max}$ are related to an uplink subcarrier spacing. $N_1$ represents time required by the terminal device to process a physical downlink shared channel (PDSCH), $N_2$ represents a latency of the terminal device in preparing a physical uplink shared channel (PUSCH), $L_2$ represents a processing latency of a media access control (MAC) layer of the terminal device, and $TA_{max}$ is maximum duration that is allowed to be indicated by the timing advance command (TAC). Specifically, for example, $TA_{max}$ may be maximum duration that is allowed to be indicated by a 12-bit TAC, or maximum duration that is allowed to be indicated by a 6-bit TAC.

In a possible implementation, in addition to the listed $N_1$, $N_2$, $L_2$, and $TA_{max}$, the first time interval further includes fourth duration, and the fourth duration is duration determined by the terminal device based on a cell reuse mode, or the fourth duration is duration determined by the terminal device based on a frequency range within which the terminal device or the network device works. For example, the fourth duration is duration in which the terminal device performs handover in different working modes or working frequency bands, and a time at which the terminal device performs handover is denoted as $N_{TA\ offset}$.

Optionally, duration represented by $N_{TA\ offset}$ and the maximum duration that is allowed to be indicated by the 12-bit or 6-bit TAC may be added and denoted as $TA_{max}$ as a whole. For example, the maximum duration that is allowed to be indicated by the TAC is denoted as $N_{TA}$, and $TA_{max}=N_{TA}+N_{TA\ offset}$. This is not limited in this application.

It should be understood that $N_{TA\ offset}$ is the time at which the terminal device performs handover, for example, a time at which the terminal device performs uplink-downlink handover. Specifically, the uplink-downlink handover time $N_{TA\ offset}$ may be related to a working mode or working frequency band of a communications system, and values of $N_{TA\ offset}$ according to protocols may be, for example, shown in Table 1. FR1 represents a frequency band with a frequency less than 6 GHz, and FR2 represents a frequency band with a frequency greater than 6 GHz. The FR2 frequency band may be FDD, TDD, or both.

TABLE 1

| Working mode and frequency band used for uplink transmission | $N_{TA\ offset}$ (Unit: $T_C$) |
|---|---|
| FDD FR1 frequency band | 0 |
| TDD FR1 frequency band | 39936 or 25600 |
| FR2 frequency band | 13792 |

Alternatively, when a case in which LTE and NR coexist is taken into consideration, values of $N_{TA\ offset}$ may be, for example, shown in Table 2. FR2 may be FDD, TDD, or both.

TABLE 2

| Working mode and frequency band used for uplink transmission | $N_{TA\ offset}$ (Unit: $T_C$) |
|---|---|
| FDD FR1 and TDD frequency bands do not include a scenario in which LTE and NR coexist | 25600 |
| An FDD FR1 frequency band includes the scenario in which LTE and NR coexist | 0 |
| A TDD FR1 frequency band includes the scenario in which LTE and NR coexist | 39936 |
| FR2 frequency band | 13792 |

The value of $N_{TA\ offset}$ may be obtained by using one or more messages in RRC signaling, downlink control information (DCI), and a media access control control element (MAC-CE); or may be determined in an implicit manner, for example, the value of $N_{TA\ offset}$ is implicitly indicated; or may be predefined or preconfigured. It should be understood that a manner of obtaining the value of $N_{TA\ offset}$ is not limited in this application.

In addition, FR1 represents a scenario in which a working frequency is less than 6 GHz, and FR2 represents a scenario in which a working frequency is greater than or equal to 6 GHz. The unit $T_c=1/(\Delta f_{max} \cdot N_f)$, where $\Delta f_{max}=480 \cdot 10^3$ Hz, and $N_f=4096$. Optionally, $\Delta f_{max}=\{15, 30, 60, 120, 240\}10^3$, and is applied to different working frequency bands or subcarrier spacings. $N_f=\{512, 1024, 2048\}$ is applied to different fast Fourier transform (FFT) sampling frequencies.

When a second uplink carrier is configured for the terminal device, $N_{TA\ offset}$ may be determined based on a non-SUL carrier. The second uplink carrier herein means a supplementary uplink (SUL) carrier.

It should be understood that, when $N_{TA\ offset}$ is considered during determining of $TA_{max}$, Formula (1) may equivalently be represented as:

$$N=\text{ceil}(N_1+N_2+L_2+N_{TA}+N_{TA\ offset}) \quad (2)$$

In addition, it should be noted herein that the downlink signal in this embodiment of this application may be a signal transmitted on a PDCCH, such as DCI or a demodulation reference signal (DMRS); or may be data or information transmitted on a PDSCH. The uplink signal may be data or information transmitted on a PUSCH, for example, uplink scheduling information, uplink control information (UCI), or feedback information. Specifically, the uplink signal is, for example, an acknowledgment (ACK)/a negative acknowledgment (NACK), or an uplink scheduling request (SR). It should be understood that this application includes these but is not limited thereto.

A 5G mobile communications system supports a plurality of subcarrier spacings (for example, the subcarrier spacings are applicable to different service types or working frequencies), and symbols of different subcarrier spacings respectively correspond to cyclic prefixes (CP) having different lengths. Correspondingly, different subcarrier spacings correspond to different anti-latency influence performance. Therefore, the UE uses different timing advances in different scenarios, so that diversified requirements of a 5G mobile communications system for uplink synchronization can be met. Currently, in carrier resources, different subcarrier spacings include 15 kHz, 30 kHz, 60 kHz, and 120 kHz, and may have more possibilities in the future. It should be understood that this application includes these subcarrier spacings but is not limited thereto.

According to the protocol TS 38.214, a relationship between $N_1$ and an uplink subcarrier is also shown in Table 3 below. $\mu$ represents a subcarrier spacing, and 0, 1, 2, and 3 respectively correspond to 15 kHz, 30 kHz, 60 kHz, and 120 kHz. PDSCH decoding time $N_1$ in Table 3 has two different reference cases. Because the TA adjustment command in this application may be included in a MAC-CE and carried on a PDSCH, one case is a decoding time of a PDSCH with an additional demodulation reference signal (DMRS), and the other case is a decoding time of a PDSCH without an additional demodulation reference signal (DMRS). In this embodiment of this application, a relatively large decoding time, that is, the decoding time of the PDSCH with the additional DMRS, is used as an example for detailed description. It should be understood that this embodiment of this application includes these but is not limited thereto.

TABLE 3

| | PDSCH decoding time $N_1$ (unit: symbol) | |
|---|---|---|
| $\mu$ | A DMRS of a PDSCH is not added. | An additional DMRS of a PDSCH is added. |
| 0 | 8 | 13 |
| 1 | 10 | 13 |
| 2 | 17 | 20 |
| 3 | 20 | 24 |

It should be understood that the symbol herein is a minimum unit of a time domain resource. In this embodiment of this application, a time length of a symbol is not limited. For different subcarrier spacings, a length of a symbol may differ. The symbol may include an uplink symbol and a downlink symbol. As an example instead of a limitation, the uplink symbol may be referred to as a single carrier-frequency division multiple access (SC-FDMA) symbol, an orthogonal frequency division multiplexing (OFDM) symbol, or the like. The downlink symbol may be referred to as an OFDM symbol or the like. This embodiment of this application includes these but is not limited thereto.

A relationship between $N_2$ and an uplink subcarrier is also shown in Table 4 below. $\mu$ represents a subcarrier spacing, and 0, 1, 2, and 3 respectively correspond to 15 kHz, 30 kHz, 60 kHz, and 120 kHz.

TABLE 4

| $\mu$ | PUSCH preparation time $N_2$ (unit: symbol) |
|---|---|
| 0 | 10 |
| 1 | 12 |
| 2 | 23 |
| 3 | 36 |

A relationship between $TA_{max}$ and an uplink subcarrier is also shown in Table 5 below. Time lengths of $TA_{max}$ when subcarrier spacings are respectively 15 kHz, 30 kHz, 60 kHz, and 120 kHz are listed.

TABLE 5

| Subcarrier spacing (unit: kHz) | $TA_{max}$ (unit: ms) |
|---|---|
| 15 | 2 |
| 30 | 1 |
| 60 | 0.5 |
| 120 | 0.25 |

In a process of determining an actual time interval N, the foregoing one timing advance group (TAG) includes a plurality of cells, each cell may include a plurality of terminal devices, and a plurality of uplink carrier resources are configured for each terminal device. In an existing solution, a plurality of uplink resources in a timing advance group (TAG) have different subcarrier spacings (SCS). Specifically, when subcarrier spacings of 15 kHz, 30 kHz, 60 kHz, and 120 kHz are configured for the terminal device, a time interval N can be determined for each subcarrier spacing.

For example, when the subcarrier spacing of 15 kHz is used as a reference, the first time interval $N=\text{ceil}(N_1+N_2+L_2+TA_{max})=\text{ceil}(13 \text{ symbols}+10 \text{ symbols}+0.5 \text{ ms}+2 \text{ ms})=\text{ceil}(58 \text{ symbols})=5 \text{ ms}$ according to Formula (1). 0.5 ms=7 symbols, and 2 ms=28 symbols.

When the subcarrier spacing of 30 kHz is used as a reference, the first time interval $N=\text{ceil}(N_1+N_2+L_2+TA_{max})=\text{ceil}(13 \text{ symbols}+12 \text{ symbols}+0.5 \text{ ms}+1 \text{ ms})=\text{ceil}(67 \text{ symbols})=2.5 \text{ ms}$ according to Formula (1). 0.5 ms=14 symbols, and 1 ms=28 symbols.

It can be learned from the foregoing calculation process that in cases of different UL subcarrier spacings, absolute lengths of $N_1$, $N_2$, and $TA_{max}$ are different. Consequently, TA effective times of different UL carriers in a same TAG are different. Different TA effective times increase implementation complexity of the terminal device, and do not conform to a definition of a same TAG.

An embodiment of this application provides a method for determining a TA effective time. A time interval N before the TA effective time is determined, and it is ensured that for a same terminal device, the time interval N is consistent when a plurality of UL subcarrier spacings are included. In this way, in a same TAG, TA effective times of the terminal device are consistent, so that uplink timing synchronization between the terminal device and the network device can be ensured.

Figure 5:
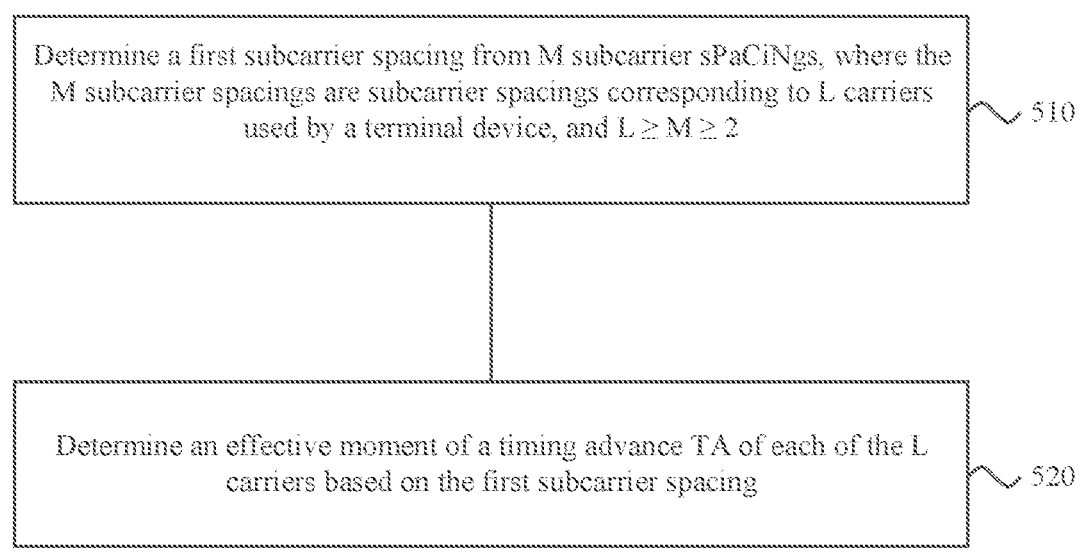
FIG. 5 is a schematic flowchart of a method for determining an effective moment of a TA according to an embodiment of this application.

FIG. 5 is a schematic flowchart of a method for determining an effective moment of a TA according to an embodiment of this application. The method 500 includes the following steps.

S510. A terminal device determines a first subcarrier spacing from M subcarrier spacings, where the M subcarrier spacings are subcarrier spacings corresponding to L carriers used by a terminal device, and L≥M≥2.

Optionally, the first subcarrier spacing is a minimum subcarrier spacing among the M subcarrier spacings, or the first subcarrier spacing is a maximum subcarrier spacing among the M subcarrier spacings.

It should be understood that the first subcarrier spacing may be determined based on one or more of a maximum/minimum value among all uplink subcarrier spacings, or a maximum/minimum value among subcarrier spacings of all bandwidth parts (BWP) in an active state, or a maximum/minimum value among subcarrier spacings of a plurality of BWPs configured for the terminal device, or a maximum/minimum value among subcarrier spacings of all BWPs. Alternatively, the first subcarrier spacing may be fixedly set to a subcarrier spacing, for example, for a low frequency (a working frequency that is less than or equal to 6 GHz), the first subcarrier spacing may be fixedly set to 15 kHz. This embodiment of this application includes these but is not limited thereto.

In this embodiment of this application, one terminal device is used as an example for description. It is assumed that a network device configures L uplink carrier resources for a terminal device #A, and each of the L uplink carrier resources has one subcarrier spacing, that is, the L uplink carrier resources have a total of M subcarrier spacings. Two or more of the L uplink carrier resources may have a same subcarrier spacing. Currently, in carrier resources, different subcarrier spacings include 15 kHz, 30 kHz, 60 kHz, and 120 kHz, and may have more possibilities in the future. It should be understood that this application includes these subcarrier spacings but is not limited thereto.

For example, if the network device configures four uplink carrier resources for the terminal device #A, the four uplink carrier resources may have only one type of subcarrier spacing, for example, a subcarrier spacing of each of the four uplink carrier resources is 15 kHz; or the four uplink carrier resources may have two types of subcarrier spacings, for example, a subcarrier spacing of one of the four uplink carrier resources is 15 kHz, and subcarrier spacings of the other three uplink carrier resources are 30 kHz; or the four uplink carrier resources may have three types of subcarrier spacings, for example, a subcarrier spacing of one of the four uplink carrier resources is 15 kHz, a subcarrier spacing of another one of the four uplink carrier resources is 30 kHz, and subcarrier spacings of the other two uplink carrier resources are 60 kHz; or the four uplink carrier resources may have four types of subcarrier spacings, for example, a subcarrier spacing of one of the four uplink carrier resources is 15 kHz, a subcarrier spacing of another one of the four uplink carrier resources is 30 kHz, a subcarrier spacing of still another one of the four uplink carrier resources is 60 kHz, and a subcarrier spacing of the other UL carrier is 120 kHz. The foregoing enumeration is merely a possible case and is merely used to describe a possible relationship between a subcarrier spacing and a carrier resource. It should be understood that this application includes this case but is not limited thereto.

It can be learned from the foregoing enumeration that a relationship between L and M may be that a quantity L of carrier resources is greater than or equal to a quantity M of subcarrier spacings. Herein, it is limited that L≥M≥2, and this is mainly because when the network device configures one carrier resource for the terminal device, the one carrier resource certainly has only one subcarrier spacing, for example, a subcarrier spacing of 15 kHz. In this case, in a process of calculating a first time interval, because $N_1$, $N_2$, and $TA_{max}$ are determined based on the subcarrier spacing of 15 kHz and then respectively based on Table 1, Table 2, and Table 3, a problem that TA effective times of different UL carriers are different does not occur. Therefore, in this application, M may be a positive integer greater than or equal to 2.

Optionally, when the first time interval N is calculated based on the quantity of subcarrier spacings, a subcarrier spacing of a carrier resource of a downlink signal is used as a reference.

Optionally, the first time interval may be determined with reference to a maximum subcarrier spacing or a minimum subcarrier spacing. For example, if the maximum subcarrier spacing is 30 kHz, and the minimum subcarrier spacing is 15 kHz, the first time interval determined according to the foregoing method is 5 ms. When the first time interval is determined with reference to the subcarrier spacing of 15 kHz, 5 ms is equivalent to 5 slots. To be specific, for an uplink carrier of 15 kHz, a TA is applied starting from a sixth slot. When the first time interval is determined with reference to the subcarrier spacing of 30 kHz, 5 ms is equivalent to 10 slots. To be specific, for an uplink carrier of 30 kHz, a TA is applied starting from an eleventh slot.

Optionally, when the first time interval is determined with reference to the maximum subcarrier spacing, for a small subcarrier spacing, the first time interval cannot be integral slots, and a rounding up operation needs to be performed on the first time interval. The rounding up operation means selecting a value that is greater than the original first time interval and that is a minimum integer multiple of slot duration corresponding to the minimum subcarrier spacing. For example, the first time interval determined according to the foregoing method is 2.5 ms, and includes two carriers (15 kHz and 30 kHz). Because 2.5 ms is not an integer multiple of a slot corresponding to the subcarrier spacing of 15 kHz, the first time interval of 2.5 ms needs to be rounded up first based on a step of 15 kHz, that is, 3 ms. 3 ms corresponds to 3 slots (15 kHz) and 6 slots (30 kHz). Therefore, for the subcarrier spacing of 15 kHz, a new TA is applied starting from a fourth slot, and for the subcarrier spacing of 30 kHz, a new TA is applied starting from a seventh slot.

Specifically, in a process of determining $N_1$, $\mu=\min(\mu_{DL}, \mu_{UL})$, where $\mu_{DL}$ corresponds to a subcarrier spacing of a PDSCH, and $\mu_{UL}$ corresponds to a subcarrier spacing of a hybrid automatic repeat request acknowledgement (HARQ-ACK) corresponding to uplink transmission. In a process of determining $N_2$, $\mu=\min(\mu_{DL}, \mu_{UL})$, where $\mu DL$ may be a subcarrier spacing of a PDCCH used for scheduling a PUSCH in downlink, and $\mu_{UL}$ corresponds to a subcarrier spacing used for sending a PUSCH in uplink. In a process of determining $TA_{max}$, $\mu$ corresponds to a subcarrier spacing of an uplink PUSCH. It should be understood that, both the PDCCH and the PDSCH are collectively referred to as a downlink carrier resource DL, and generally correspond to only one type of subcarrier spacings. This application includes these but is not limited thereto.

For example, when a subcarrier spacing of a downlink DL is 15 kHz, and a subcarrier spacing of an uplink (UL) is 30 kHz, $\mu=\min(\mu_{DL}, \mu_{UL})=\min(15\text{ kHz}, 30\text{ kHz})=15\text{ kHz}$.

In S510, the terminal device determines the first subcarrier spacing from the M subcarrier spacings. Specific methods for determining the first subcarrier spacing are listed as follows:

Case 1

For the L uplink (UL) carriers, $N_1$ and $N_2$ are determined with reference to a minimum UL subcarrier spacing. For example, if L=2 uplink (UL) carriers are configured for the UE, and subcarrier spacings are respectively 15 kHz and 30 kHz, $N_1$ and $N_2$ are calculated based on 15 kHz.

Case 2

For the L uplink (UL) carriers, $N_1$ and $N_2$ are determined with reference to a maximum UL subcarrier spacing. For example, if L=2 uplink (UL) carriers are configured for the UE, and subcarrier spacings are respectively 15 kHz and 30 kHz, $N_1$ and $N_2$ are calculated based on 30 kHz.

Case 3

For the L uplink (UL) carriers, $TA_{max}$ is determined with reference to a minimum UL subcarrier spacing. For example, if L=2 uplink (UL) carriers are configured for the UE, and subcarrier spacings are respectively 15 kHz and 30 kHz, $TA_{max}$ is calculated based on 15 kHz.

Case 4

For the L uplink (UL) carriers, $TA_{max}$ is determined with reference to a maximum UL subcarrier spacing. For example, if L=2 uplink (UL) carriers are configured for the UE, and subcarrier spacings are respectively 15 kHz and 30 kHz, $TA_{max}$ is calculated based on 30 kHz.

Case 5

For the L uplink (UL) carriers, $N_1$, $N_2$, and $TA_{max}$ are determined with reference to a minimum UL subcarrier spacing. For example, if L=2 uplink (UL) carriers are configured for the UE, and subcarrier spacings are respectively 15 kHz and 30 kHz, a time interval is calculated based on 15 kHz.

Case 6

For the L uplink (UL) carriers, $N_1$, $N_2$, and $TA_{max}$ are determined with reference to a maximum UL subcarrier spacing. For example, if L=2 uplink (UL) carriers are configured for the UE, and subcarrier spacings are respectively 15 kHz and 30 kHz, a time interval is calculated based on 30 kHz.

Case 7

For the L uplink (UL) carriers, $N_1$ and $N_2$ are determined with reference to a minimum UL subcarrier spacing, and $TA_{max}$ is determined with reference to a maximum UL subcarrier spacing.

For example, if L=2 uplink (UL) carriers are configured for the UE, and subcarrier spacings are respectively 15 kHz and 30 kHz, during calculation of a time interval, $N_1$ and $N_2$ are determined based on 15 kHz, and $TA_{max}$ is determined based on 30 kHz.

Case 8

For the L uplink (UL) carriers, $N_1$ and $N_2$ are determined with reference to a maximum UL subcarrier spacing, and $TA_{max}$ is determined with reference to a minimum UL subcarrier spacing.

For example, if L=2 uplink (UL) carriers are configured for the UE, and subcarrier spacings are respectively 15 kHz and 30 kHz, during calculation of a time interval, $N_1$ and $N_2$ are determined based on 30 kHz, and $TA_{max}$ is determined based on 15 kHz.

Case 9

For the L uplink (UL) carriers, $N_1$ and $N_2$ are determined with reference to a minimum UL subcarrier spacing, and $TA_{max}$ is determined with reference to a minimum value in a subcarrier spacing in the uplink (UL) carriers and a subcarrier spacing of a carrier resource used to transmit an Msg3, that is, $\mu=\min(\text{Msg3 SCS}, \text{UL SCS})$.

Case 10

For the L uplink (UL) carriers and subcarrier spacings of T messages 3 (Msg3) in a random access process, N1 and N2 are determined with reference to a minimum UL subcarrier spacing, and $TA_{max}$ is determined with reference to a maximum/minimum subcarrier spacing, that is, $\mu=\min(\max(\text{Msg3 SCSs}), \text{UL SCS})$, or $\mu=\min(\min(\text{Msg3 SCSs}), \text{UL SCS})$.

For example, if a base station configures random access resources on the UL carrier and an SUL carrier, and subcarrier spacings of the Msg3 of the base station are respectively 15 kHz or 30 kHz, $\mu$ corresponding to $TA_{max}$ is determined with reference to the minimum subcarrier spacing 15 kHz, or $\mu$ is determined with reference to the maximum subcarrier spacing 30 kHz.

Optionally, the L uplink (UL) subcarrier spacings (UL SCSs) may be SCSs of all bandwidth parts in an active state, or subcarrier spacings of a plurality of BWPs configured for the terminal device, or subcarrier spacings of all BWPs.

It should be understood that, in a random access process, a subcarrier spacing of an uplink carrier resource for transmitting the Msg3 may be 15 kHz. After the random access process is completed, the subcarrier spacing for transmitting the uplink resource may be reconfigured. For example, a subcarrier spacing of an allocated carrier resource may be 30 kHz or 60 kHz. Therefore, in consideration of impact of random access, impact of the subcarrier spacing of the Msg3 is considered in a process of determining $TA_{max}$ herein. In addition, because a plurality of uplink carriers may each have a corresponding random access resource, all uplink carriers may correspond to different subcarrier spacings of the message 3. For example, an uplink (UL) carrier and a supplementary uplink (SUL) carrier are configured for the UE. The message 3 may have two subcarrier spacings, for example, 15 kHz and 30 kHz respectively. Therefore, in the process of determining $TA_{max}$, impact of a plurality of subcarrier spacings of the Msg3 is also taken into consideration.

For example, an uplink (UL) subcarrier spacing used by the UE is different from that of the Msg3. To support a maximum coverage range, $TA_{max}$ needs to be a minimum value in the subcarrier spacing of the Msg3 and the configured UL subcarrier spacing (SCS). For example, if L=2 uplink (UL) carriers are configured for the UE, subcarrier spacings are respectively 60 kHz and 30 kHz, and in a random access process, a subcarrier spacing (SCS) of a carrier resource for transmitting the Msg3 is 15 kHz, during calculation of a time interval, $N_1$ and $N_2$ are determined based on 30 kHz, and $TA_{max}$ is determined based on 15 kHz.

Ten possible cases of the first subcarrier spacing used for determining $N_1$, $N_2$, and $TA_{max}$ are listed above. It should be understood that the foregoing cases are merely examples instead of limitations. In various processes of determining the first subcarrier spacing, there may be more cases of combining the first subcarrier spacings used for determining $N_1$, $N_2$, and $TA_{max}$. This application includes these cases but is not limited thereto.

Optionally, in a process of determining the first subcarrier spacing, the terminal device may set a first threshold, and determine the first threshold as the first subcarrier spacing, to participate in subsequent determining of the effective moment of the TA.

Optionally, the foregoing method provided in this application may alternatively be used in combination with the prior art. For example, a minimum value is obtained from the determined first subcarrier spacing of the uplink carrier resource and a subcarrier spacing of a downlink carrier resource, to obtain a subcarrier spacing. Details are not described herein. It should be understood that this application includes these but is not limited thereto.

In conclusion, the method for determining the first subcarrier spacing provided in this embodiment of this application is to ensure that for a same terminal device, the time interval N is consistent when a plurality of UL subcarrier spacings are included. In this way, in a same TAG, TA effective times of the terminal device are consistent, so that uplink timing synchronization between the terminal device and the network device can be ensured.

S520. The terminal device determines an effective moment of a timing advance (TA) of each of the L carriers based on the first subcarrier spacing.

By using the method in S510, the terminal device determines the first subcarrier spacing, and may further determine the effective moment of the timing advance (TA) of each carrier.

Optionally, the terminal device determines, based on the first subcarrier spacing, a first time interval corresponding to a first carrier in the L carriers, where the first time interval is a time interval between a receiving moment of a downlink signal and an effective moment of a TA; and then determines the effective moment of the timing advance (TA) of each of the L carriers based on the first time interval.

For example, when a subcarrier spacing of a downlink DL is 15 kHz, the subcarrier spacing of the uplink (UL) carrier is 30 kHz, and $\mu=\min(\mu_{DL}, \mu_{UL})=\min(15 \text{ kHz}, 30 \text{ kHz})=15$ kHz, it is learned according to Formula (1) that the first time interval $N=\text{ceil}(N_1+N_2+L_2+TA_{max})=\text{ceil}(13 \text{ symbols}+10 \text{ symbols}+0.5 \text{ ms}+2 \text{ ms})=\text{ceil}(58 \text{ symbols})=_5$ ms.

Optionally, the terminal device determines first duration $N_1$ based on the first subcarrier spacing, where the first duration is duration required for processing a downlink signal; and/or determines second duration $N_2$ based on the first subcarrier spacing, where the second duration is duration required for preparing an uplink signal; and/or determines third duration $TA_{max}$ based on the first subcarrier spacing, where the third duration is maximum duration that is allowed to be indicated by a 12-bit timing advance command (TAC) when the third duration is determined based on the first subcarrier spacing. The terminal device determines the first time interval based on one or more of the first duration $N_1$, the second duration $N_2$, and the third duration $TA_{max}$. It should be understood that a value of 12 bits herein is merely an example instead of a limitation, and another possible value less than 12 bits, for example, 6 bits, may also be used.

Optionally, the first time interval further includes fourth duration, and the fourth duration is duration determined by the terminal device based on a cell reuse mode, and/or the fourth duration is duration determined by the terminal device based on a frequency range within which the terminal device or the network device works. For example, the fourth duration may be duration in which the terminal device performs handover in different working modes or working frequency bands. For details about the fourth duration, refer to the foregoing related descriptions. The details are not described herein again. It should be understood that the duration required for processing a downlink signal is related to a downlink signal configuration such as a demodulation reference signal configuration, and/or a downlink signal subcarrier spacing, and/or a UE processing capability. It should be understood that the duration required for preparing an uplink signal is related to an uplink signal subcarrier spacing and/or a UE processing capability.

It should be understood that in the listed processes of determining the first time interval herein, a sum may be obtained according to Formula (i) by separately determining duration of $N_1$, $N_2$, $L_2$, and $TA_{max}$, to obtain the first time interval N. Alternatively, in this embodiment of this application, only duration of one or more of $N_1$, $N_2$, $L_2$, and $TA_{max}$ may be determined. In a technology development process, only duration of at least one of $N_1$, $N_2$, $L_2$, and $TA_{max}$ needs to be determined, and the first time interval N may be obtained by using a specific relationship. Herein, a method for determining duration of any one or more of $N_1$, $N_2$, $L_2$, and $TA_{max}$ by using the method provided in this application falls within the protection scope of this application.

Specifically, examples of determining the first time interval N that correspond to the listed ten cases are listed as follows:

Case 1

For the L uplink (UL) carriers, $N_1$ and $N_2$ are determined with reference to a minimum UL subcarrier spacing. For example, if L=2 uplink (UL) carriers are configured for the UE, and subcarrier spacings are respectively 15 kHz and 30 kHz, $N_1$ and $N_2$ are calculated based on 15 kHz. $N_1$=13 symbols, and $N_2$=10 symbols.

Case 2

For the L uplink (UL) carriers, $N_1$ and $N_2$ are determined with reference to a maximum UL subcarrier spacing. For example, if L=2 uplink (UL) carriers are configured for the UE, and subcarrier spacings are respectively 15 kHz and 30 kHz, $N_1$ and $N_2$ are calculated based on 30 kHz. $N_1$=13 symbols, and $N_2$=12 symbols.

Case 3

For the L uplink (UL) carriers, $TA_{max}$ is determined with reference to a minimum UL subcarrier spacing. For example, if L=2 uplink (UL) carriers are configured for the UE, and subcarrier spacings are respectively 15 kHz and 30 kHz, $TA_{max}$ is calculated based on 15 kHz. $TA_{max}$=2 MS.

Case 4

For the L uplink (UL) carriers, $TA_{max}$ is determined with reference to a maximum UL subcarrier spacing. For example, if L=2 uplink (UL) carriers are configured for the UE, and subcarrier spacings are respectively 15 kHz and 30 kHz, $TA_{max}$ is calculated based on 30 kHz. $TA_{max}$=1 ms.

Case 5

For the L uplink (UL) carriers, $N_1$, $N_2$, and $TA_{max}$ are determined with reference to a minimum UL subcarrier spacing. For example, if L=2 uplink (UL) carriers are configured for the UE, and subcarrier spacings are respectively 15 kHz and 30 kHz, a time interval is calculated based on 15 kHz. For an uplink (UL) carrier whose subcarrier spacings are 15 kHz and 30 kHz, a first time interval N=ceil($N_1$+$N_2$+$TA_{max}$)=ceil(13 symbols+10 symbols+0.5 ms+2 ms)=ceil(58 symbols)=$_5$ ms.

Case 6

For the L uplink (UL) carriers, $N_1$, $N_2$, and $TA_{max}$ are determined with reference to a maximum UL subcarrier spacing. For example, if L=2 uplink (UL) carriers are configured for the UE, and subcarrier spacings are respectively 15 kHz and 30 kHz, a time interval is calculated based on 30 kHz. For an uplink (UL) carrier whose subcarrier spacings are 15 kHz and 30 kHz, a first time interval N=ceil($N_1$+$N_2$+$L_2$+$TA_{max}$)=ceil(13 symbols+12 symbols+0.5 ms+1 ms)=ceil(67 symbols)=2.5 ms.

Case 7

For the L uplink (UL) carriers, $N_1$ and $N_2$ are determined with reference to a minimum UL subcarrier spacing, and $TA_{max}$ is determined with reference to a maximum UL subcarrier spacing.

For example, if L=2 uplink (UL) carriers are configured for the UE, and subcarrier spacings are respectively 15 kHz and 30 kHz, during calculation of a time interval, $N_1$ and $N_2$ are determined based on 15 kHz, and $TA_{max}$ is determined based on 30 kHz. For an uplink (UL) carrier whose subcarrier spacings are 15 kHz and 30 kHz, a first time interval N=ceil($N_1$+$N_2$+$L_2$+$TA_{max}$)=ceil(13 symbols+10 symbols+0.5 ms+1 ms)=ceil(44 symbols)=4 ms.

Case 8

For the L uplink (UL) carriers, $N_1$ and $N_2$ are determined with reference to a maximum UL subcarrier spacing, and $TA_{max}$ is determined with reference to a minimum UL subcarrier spacing.

For example, if L=2 uplink (UL) carriers are configured for the UE, and subcarrier spacings are respectively 15 kHz and 30 kHz, during calculation of a time interval, $N_1$ and $N_2$ are determined based on 30 kHz, and $TA_{max}$ is determined based on 15 kHz. For an uplink (UL) carrier whose subcarrier spacings are 15 kHz and 30 kHz, a first time interval N=ceil($N_1$+$N_2$+$L_2$+$TA_{max}$)=ceil(13 symbols+12 symbols+0.5 ms+2 ms)=ceil(60 symbols)=5 ms.

Case 9

For the L uplink (UL) carriers, $N_1$ and $N_2$ are determined with reference to a minimum UL subcarrier spacing, and $TA_{max}$ is determined with reference to a minimum value in a subcarrier spacing in the uplink (UL) carriers and a subcarrier spacing of a carrier resource used to transmit an Msg3, that is, μ=min(Msg3 SCS, UL SCS).

Case 10

For the L uplink (UL) carriers and subcarrier spacings of M messages 3 (Msg3) in a random access process, N1 and N2 are determined with reference to a minimum subcarrier spacing, and $TA_{max}$ is determined with reference to a maximum/minimum subcarrier spacing, that is, μ=min(max(Msg3 SCSs), UL SCS), or μ=min(min(Msg3 SCSs), UL SCS).

For example, if the base station configures random access resources on the UL and an SUL, and subcarrier spacings of the messages 3 of the base station are respectively 15 kHz or 30 kHz, μ corresponding to $TA_{max}$ is determined with reference to the minimum subcarrier spacing 15 kHz, or μ is determined with reference to the maximum subcarrier spacing 30 kHz.

Optionally, the L uplink subcarrier spacings (UL SCSs) may be SCSs of all bandwidth parts BWPs in an active state, or subcarrier spacings of a plurality of BWPs configured for the terminal device, or subcarrier spacings of all BWPs.

It should be understood that, in a random access process, a subcarrier spacing of an uplink carrier resource for transmitting the Msg3 may be 15 kHz. After the random access process is completed, the subcarrier spacing for transmitting the uplink resource may be reconfigured. For example, a subcarrier spacing of an allocated carrier resource may be 30 kHz or 60 kHz. Therefore, in consideration of impact of random access, impact of the subcarrier spacing of the Msg3 is considered in a process of determining $TA_{max}$ herein. In addition, because a plurality of uplink carriers may each have a corresponding random access resource, the uplink carriers may correspond to different subcarrier spacings of the message 3. For example, an uplink carrier UL and an SUL are configured for the UE. The message 3 may have two subcarrier spacings, for example, 15 kHz and 30 kHz respectively. Therefore, in the process of determining $TA_{max}$, impact of a plurality of subcarrier spacings of the Msg3 is also taken into consideration.

For example, an uplink (UL) subcarrier spacing used by the UE is different from that of the Msg3. To support a maximum coverage range, $TA_{max}$ needs to be a minimum value in the subcarrier spacing of the Msg3 and the configured UL subcarrier spacing (SCS). For example, if L=2 uplink (UL) carriers are configured for the UE, subcarrier spacings are respectively 60 kHz and 30 kHz, and in a random access process, a subcarrier spacing (SCS) of a carrier resource for transmitting the Msg3 is 15 kHz, during calculation of a time interval, $N_1$ and $N_2$ are determined based on 30 kHz, and $TA_{max}$ is determined based on 15 kHz. When a subcarrier spacing (SCS) of a downlink UL is 15 kHz, for an uplink (UL) carrier whose subcarrier spacings are 30 kHz and 60 kHz, a first time interval N=ceil(N$_1$+N$_2$+ L$_2$+TA$_{max}$)=ceil(13 symbols+12 symbols+0.5 ms+2 ms)=ceil(60 symbols)=$_5$ ms.

The foregoing enumerates ten possible cases of determining the first time interval based on the first subcarrier spacing. It should be understood that the foregoing cases are merely examples instead of limitations. This application includes these cases but is not limited thereto.

Optionally, in another possible implementation, the terminal device determines a first mapping relationship, where the first mapping relationship includes a one-to-one mapping relationship between a plurality of subcarrier spacing and a plurality of pieces of duration. The terminal device determines, based on the first mapping relationship, a first time interval corresponding to the first subcarrier spacing, and then determines the effective moment of the timing advance (TA) of each of the L carriers based on the first time interval.

Specifically, the terminal device learns, based on a network device configuration, subcarrier spacings of all uplink (UL) carriers in a TAG; and then, receives a MAC-CE that includes a TA adjustment command and that is delivered by the network device, and determines an effective moment of a TA; and then, can use a new TA included in the MAC-CE.

After receiving the MAC-CE that includes TA adjustment, the terminal device determines the first time interval based on a minimum or maximum uplink subcarrier spacing in a same TAG. For example, the terminal device may determine the first time interval based on a preset function in Table 6.

TABLE 6

| Subcarrier spacing (unit: kHz) | First time interval (unit: ms) |
|---|---|
| 15 | 6 + n |
| 30 | 3 + 0.5n |
| 60 | 2.25 + 0.25n |
| 120 | 1.5 + 0.125n |

A value set of the integer n may be {−6, −5, −4, −3, −2, −1, 0, 1, 2, 3, 4, 5, 6, 7, 8, 9, 10, 11, 12}.

Optionally, a slot quantity equivalent to the first time interval in Table 4 may be used to represent the first time interval N, as shown in Table 7.

TABLE 7

| Subcarrier spacing (unit: kHz) | Effective time interval (unit: slot) |
|---|---|
| 15 | 6 + n |
| 30 | 6 + n |
| 60 | 9 + n |
| 120 | 12 + n |

A value set of the integer n may be {−6, −5, −4, −3, −2, −1, 0, 1, 2, 3, 4, 5, 6, 7, 8, 9, 10, 11, 12}.

The foregoing describes a detailed process in which the terminal device determines the effective moment of the timing advance (TA). After determining the first time interval N, the terminal device can determine the effective moment of the TA by adding duration represented by the first time interval N to the receiving moment of the downlink signal. After determining the effective moment of the timing advance (TA) of each of the L carriers, the terminal device may send the uplink information based on the timing advance (TA).

The UE may send uplink data according to the method shown in FIG. 3. For example, the UE may determine a downlink radio frame i based on a received downlink radio frame i−1, and determine, based on a timing advance T$_{TA}$, that a start moment of an uplink radio frame i is T$_0$-T$_{TA}$, where T$_0$ is a start moment at which the UE receives the downlink radio frame i. The UE may determine, based on the start moment of the uplink radio frame i, a time for sending uplink information. The time in which the UE sends the uplink information may be a part of time in the uplink radio frame.

Figure 6:
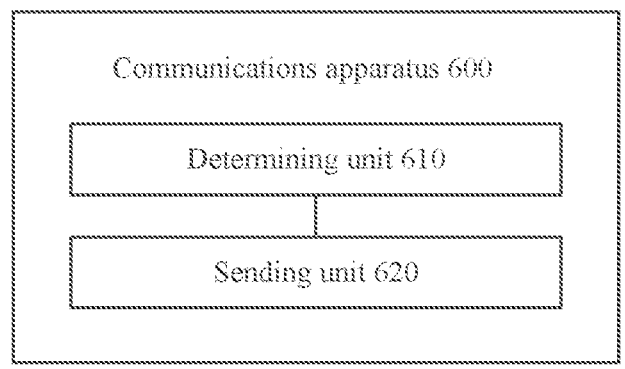
FIG. 6 is a schematic block diagram of an example communications apparatus according to an embodiment of this application.

The foregoing describes in detail the method for determining an effective moment of a TA provided in this application with reference to FIG. 2 to FIG. 5. It may be understood that, to achieve the foregoing functions, a terminal device includes corresponding hardware structures and/or software modules for performing the functions. The following describes a communications apparatus in the embodiments of this application in detail with reference to FIG. 6 to FIG. 8. FIG. 6 is a schematic block diagram of a communications apparatus 600 according to an embodiment of this application. The communications apparatus 600 may correspond to (for example, may be configured on or may be) the terminal device described in the method 500. When an integrated unit is used, FIG. 6 is a schematic diagram of a possible structure of the terminal device in the foregoing embodiments. The terminal device 600 includes a determining unit 610 and a sending unit 620.

In a possible design, the communications apparatus 600 may be a terminal device or a chip configured in the terminal device.

The determining unit 610 is configured to determine a first subcarrier spacing from M subcarrier spacings, where the M subcarrier spacings are subcarrier spacings corresponding to L carriers used by a terminal device, and L≥M≥2.

The determining unit 610 is further configured to determine an effective moment of a timing advance (TA) of each of the L carriers based on the first subcarrier spacing.

Optionally, the determining unit 610 is further configured to: determine, based on the first subcarrier spacing, a first time interval corresponding to a first carrier in the L carriers, where the first time interval is a time interval between a receiving moment of a downlink signal and an effective moment of a TA; and determine the effective moment of the timing advance (TA) of each of the L carriers based on the first time interval.

Optionally, the determining unit 610 is further configured to: determine first duration based on the first subcarrier spacing, where the first duration is duration required for processing a downlink signal; and/or determine second duration based on the first subcarrier spacing, where the second duration is duration required for preparing an uplink signal; and/or determine third duration based on the first subcarrier spacing, where the third duration is maximum duration that is allowed to be indicated by a 12-bit timing advance command (TAC) when the third duration is determined based on the first subcarrier spacing. The determining unit 610 determines the first time interval based on one or more of the first duration, the second duration, and the third duration.

Optionally, the first time interval further includes fourth duration, and the fourth duration is duration determined by the terminal device based on a cell reuse mode, and/or the fourth duration is duration determined by the terminal device based on a frequency range within which the terminal device or a network device works. For example, the fourth duration is duration in which the terminal device performs handover in different working modes or working frequency bands. For details about the fourth duration, refer to the foregoing related descriptions. The details are not described herein again.

Optionally, the determining unit 610 is further configured to: determine a first mapping relationship, where the first mapping relationship includes a one-to-one mapping relationship between a plurality of subcarrier spacing and a plurality of pieces of duration; determine, based on the first mapping relationship, a first time interval corresponding to the first subcarrier spacing; and determine the effective moment of the timing advance (TA) of each of the L carriers based on the first time interval.

Optionally, the first subcarrier spacing is a minimum subcarrier spacing among the M subcarrier spacings, or the first subcarrier spacing is a maximum subcarrier spacing among the M subcarrier spacings.

It should be understood that the first subcarrier spacing may be determined based on one or more of a maximum/minimum value among all uplink subcarrier spacings, or a maximum/minimum value among subcarrier spacings of all BWPs in an active state, or a maximum/minimum value among subcarrier spacings of a plurality of BWPs configured for the terminal device, or a maximum/minimum value among subcarrier spacings of all BWPs. Alternatively, the first subcarrier spacing may be fixedly set to a subcarrier spacing, for example, for a low frequency (a working frequency that is less than or equal to 6 GHz), the first subcarrier spacing may be fixedly set to 15 kHz.

Optionally, the apparatus 600 further includes the sending unit 620, configured to send uplink information based on the timing advance (TA).

It should be understood that the communications apparatus 600 may correspond to the terminal device in the communication method 200 and the terminal device in the communication method 500 according to the embodiments of this application, and the communications apparatus 600 may include modules configured to perform the methods performed by the terminal device in the communication method 200 in FIG. 2 and the communication method 500. In addition, the modules in the communications apparatus 600 and the foregoing other operations and/or functions are separately used to implement corresponding procedures in the communication method 200 in FIG. 2 and the communication method 500. For brevity, details are not described herein again.

Figure 7:
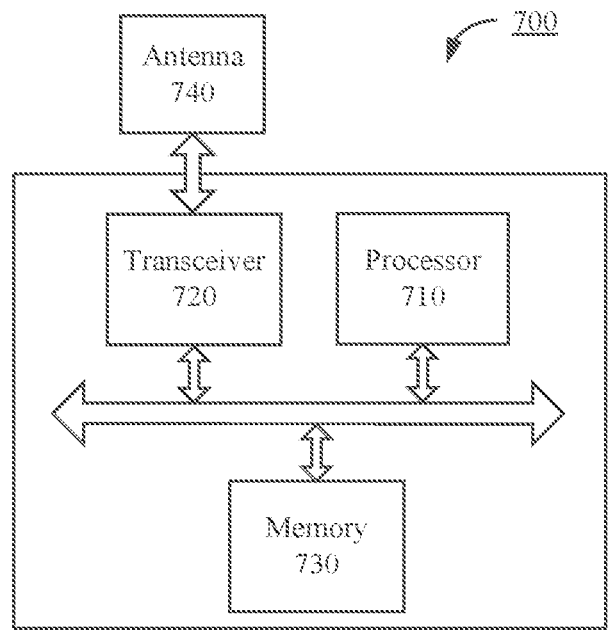
FIG. 7 is a schematic structural diagram of an example terminal device according to an embodiment of this application.

FIG. 7 is a schematic structural diagram of a terminal device 700 according to an embodiment of this application. As shown in FIG. 7, the terminal device 700 includes a processor 710 and a transceiver 720. Optionally, the terminal device 700 further includes a memory 730. The processor 710, the transceiver 720, and the memory 730 communicate with each other by using an internal connection path to transfer a control signal and/or a data signal. The memory 730 is configured to store a computer program. The processor 710 is configured to invoke and run the computer program from the memory 730, to control the transceiver 720 to receive or transmit a signal.

The processor 710 and the memory 730 may be integrated into a processing apparatus, and the processor 710 is configured to execute program code stored in the memory 730, to implement the foregoing functions. In specific implementation, the memory 730 may alternatively be integrated into the processor 710, or may be independent of the processor 710.

The terminal device may further include an antenna 740, configured to send, by using a radio signal, downlink data or downlink control signaling that is output by the transceiver 720.

Figure 8:
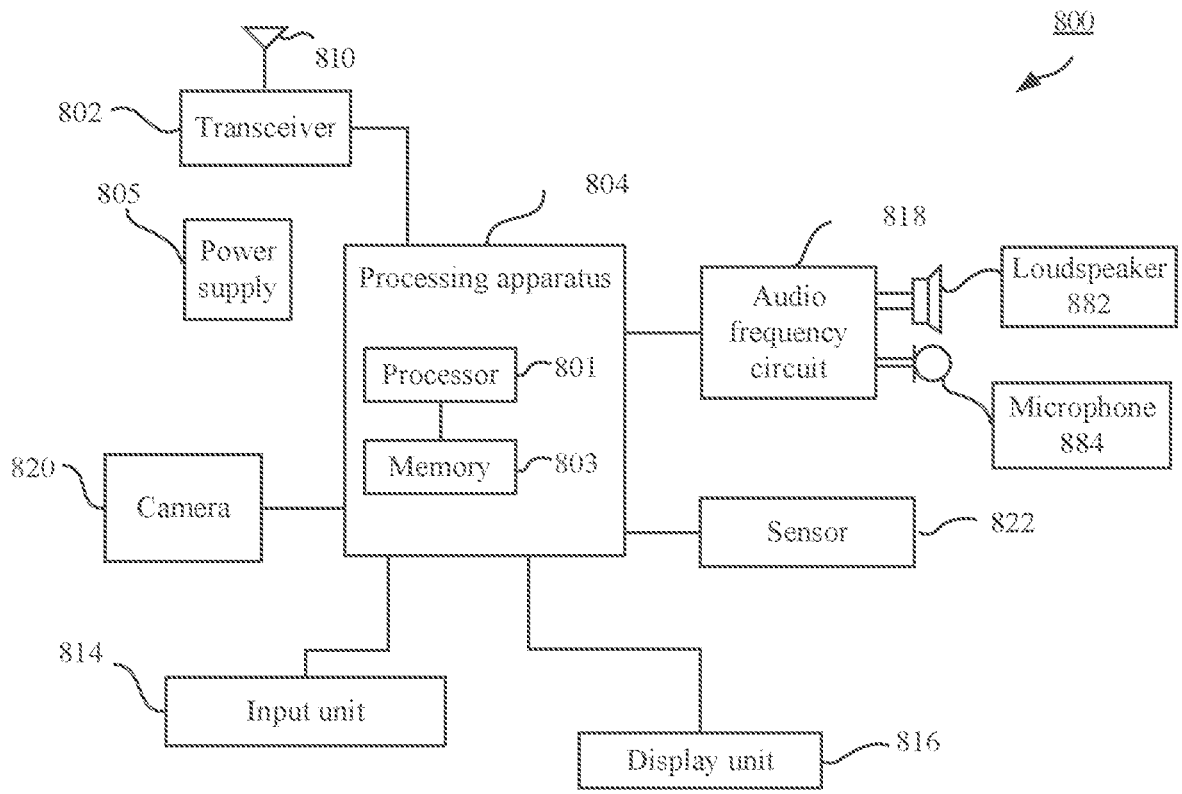
FIG. 8 is a schematic structural diagram of another example terminal device according to an embodiment of this application.

FIG. 8 is a schematic structural diagram of a terminal device 800 according to an embodiment of this application. As shown in FIG. 8, the terminal device 800 includes a processor 801 and a transceiver 802. Optionally, the terminal device 800 further includes a memory 803. The processor 802, the transceiver 802, and the memory 803 communicate with each other by using an internal connection path to transfer a control signal and/or a data signal. The memory 803 is configured to store a computer program. The processor 801 is configured to invoke and run the computer program from the memory 803, to control the transceiver 802 to receive or transmit a signal.

The processor 801 and the memory 803 may be integrated into a processing apparatus 804, and the processor 801 is configured to execute program code stored in the memory 803, to implement the foregoing functions. In specific implementation, the memory 803 may alternatively be integrated into the processor 801, or may be independent of the processor 801. The terminal device 800 may further include an antenna 810, configured to send, by using a radio signal, uplink data or uplink control signaling that is output by the transceiver 802.

Specifically, the terminal device 800 may correspond to the terminal device in the communication method 200 and the communication method 500 according to the embodiments of this application. The terminal device 800 may include modules configured to perform the methods performed by the terminal device in the communication method 200 in FIG. 2. In addition, the modules in the terminal device 800 and the foregoing other operations and/or functions are separately used to implement corresponding procedures in the communication method 200 in FIG. 2 and the communication method 500. For brevity, details are not described herein again.

The processor 801 may be configured to execute the actions implemented internally by the terminal device described in the foregoing method embodiments, and the transceiver 802 may be configured to execute the actions of performing receiving or sending by the terminal device described in the foregoing method embodiments. For details, refer to the descriptions in the foregoing method embodiments. The details are not described herein again.

The processor 801 and the memory 803 may be integrated into a processing apparatus, and the processor 801 is configured to execute program code stored in the memory 803, to implement the foregoing functions. In specific implementation, the memory 803 may alternatively be integrated into the processor 801.

The terminal device 800 may further include a power supply 805, configured to supply power to various components or circuits in the terminal device.

In addition, to improve functions of the terminal device, the terminal device 800 may further include one or more of an input unit 814, a display unit 816, an audio frequency circuit 818, a camera 820, a sensor 822, and the like. The audio frequency circuit may further include a loudspeaker 882, a microphone 884, and the like.

It should be understood that, the terminal device in the foregoing apparatus embodiments completely correspond to the terminal device in the method embodiments, and corresponding modules or units perform corresponding steps. For example, a sending module (transmitter) performs a sending step in the method embodiments, a receiving module (receiver) performs a receiving step in the method embodiments, and other steps other than the sending and receiving steps may be performed by a processing module (processor). For functions of specific modules, refer to a corresponding method embodiment. The sending module and the receiving module may form a transceiver module, and the transmitter and the receiver may form a transceiver, to jointly implement a transceiver function. There may be one or more processors.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication method, comprising:
sending, by a network device, a timing advance (TA) adjustment command to a terminal device; and
determining, by the terminal device, an effective time of an adjusted timing advance (TA) based on subcarrier spacings of more than one carrier, the effective time of the adjusted TA being a time at which the terminal device starts using the adjusted TA for uplink transmissions after receiving the TA adjustment command; and
wherein determining the effective time comprises:
determining, by the terminal device, an effective slot of the adjusted TA based on a third duration, wherein the third duration is associated with a second subcarrier spacing, the second subcarrier spacing is a minimum subcarrier spacing in a subcarrier spacing of a carrier used to transmit a message 3 (Msg3) and a subcarrier spacing of an uplink carrier configured for the terminal device, and the third duration is a maximum duration that is indicatable by a timing advance command (TAC).

2. The method according to claim 1, wherein the third duration is a maximum duration that is indicated by a 6-bit or 12-bit timing advance command (TAC).

3. The method according to claim 1, wherein the effective slot of the adjusted TA is determined further based on at least one of a first duration or a second duration, and wherein:
the first duration or the second duration is associated with a first subcarrier spacing, the first subcarrier spacing is a minimum subcarrier spacing in the subcarrier spacings of the more than one carrier, the first duration is a duration for processing a downlink signal, and the second duration is a duration for preparing an uplink signal.

4. The method according to claim 3, further comprising:
predefining, by the network device and the terminal device, a correspondence between a plurality of subcarrier spacings and respective first durations, and between the plurality of subcarrier spacings and respective second durations, the first subcarrier spacing being one of the plurality of subcarrier spacings.

5. The method according to claim 1, wherein the carrier used to transmit the Msg3 comprises a carrier that is used to transmit the Msg3 when an uplink carrier and a supplementary uplink carrier are configured for the terminal device.

6. The method according to claim 1, further comprising:
predefining, by the network device and the terminal device, a correspondence between a plurality of subcarrier spacings and respective third durations, the second subcarrier spacing being one of the plurality of subcarrier spacings.

7. The method according to claim 1, wherein the more than one carrier comprise an uplink carrier and a downlink carrier.

8. The method according to claim 1, wherein the effective time belongs to a timing advance group (TAG).

9. The method according to claim 1, wherein the subcarrier spacing of the uplink carrier configured for the terminal device is a subcarrier spacing of a bandwidth part (BWP) configured for the terminal device.

10. A communications apparatus, comprising:
at least one processor communicably coupled to one or more non-transitory memories storing programming instructions for execution by the at least one processor to perform operations comprising:
determining an effective time of an adjusted timing advance (TA) based on subcarrier spacings of more than one carrier, the effective time of the adjusted TA being a time at which a terminal device starts using the adjusted TA for uplink transmissions after receiving a TA adjustment command; and
wherein determining the effective time comprises:
determining an effective slot of the adjusted TA based on a third duration, wherein the third duration is associated with a second subcarrier spacing, the second subcarrier spacing is a minimum subcarrier spacing in a subcarrier spacing of a carrier used to transmit a message 3 (Msg3) and a subcarrier spacing of an uplink carrier configured for the terminal device, and the third duration is a maximum duration that is indicatable by a timing advance command (TAC).

11. The communications apparatus according to claim 10, wherein the third duration is a maximum duration that is indicated by a 6-bit or 12-bit timing advance command (TAC).

12. The communications apparatus according to claim 10, wherein the effective slot of the adjusted TA is determined further based on at least one of a first duration or a second duration, and wherein:
the first duration or the second duration is associated with a first subcarrier spacing, the first subcarrier spacing is a minimum subcarrier spacing in the subcarrier spacings of the more than one carrier, the first duration is a duration for processing a downlink signal, and the second duration is a duration for preparing an uplink signal.

13. The communications apparatus according to claim 12, wherein the operations further comprise:
predefining a correspondence between a plurality of subcarrier spacings and respective first durations, and between the plurality of subcarrier spacings and respective second durations, the first subcarrier spacing being one of the plurality of subcarrier spacings.

14. The communications apparatus according to claim 10, wherein the carrier used to transmit the Msg3 comprises a carrier that is used to transmit the Msg3 when an uplink carrier and a supplementary uplink carrier are configured for the terminal device.

15. The communications apparatus according to claim 10, wherein the operations further comprise:
predefining a correspondence between a plurality of subcarrier spacings and respective third durations, the second subcarrier spacing being one of the plurality of subcarrier spacings.

16. The communications apparatus according to claim 10, wherein the more than one carrier comprise an uplink carrier and a downlink carrier.

17. The communications apparatus according to claim 10, wherein the effective time belongs to a timing advance group (TAG).

18. The communications apparatus according to claim 10, wherein the communications apparatus is the terminal device or comprised in the terminal device.

19. The communications apparatus according to claim 10, wherein the subcarrier spacing of the uplink carrier configured for the communications apparatus is a subcarrier spacing of a bandwidth part (BWP) configured for the communications apparatus.

20. A communication system, comprising a network device and a terminal device;
the network device is configured to send a timing advance (TA) adjustment command to the terminal device; and
the terminal device is configured to determine an effective time of an adjusted timing advance (TA) based on subcarrier spacings of more than one carrier, the effective time of the adjusted TA being a time at which the terminal device starts using the adjusted TA for uplink transmissions after receiving the TA adjustment command; and
wherein determining the effective time comprises:
determining an effective slot of the adjusted TA based on a third duration, wherein the third duration is associated with a second subcarrier spacing, the second subcarrier spacing is a minimum subcarrier spacing in a subcarrier spacing of a carrier used to transmit a message 3 (Msg3) and a subcarrier spacing of an uplink carrier configured for the terminal device, and the third duration is a maximum duration that is indicatable by a timing advance command (TAC).

21. The system according to claim 20, wherein the third duration is a maximum duration that is indicated by a 6-bit or 12-bit timing advance command (TAC).

22. The system according to claim 20, wherein the effective slot of the adjusted TA is determined further based on at least one of a first duration or a second duration, and wherein:
the first duration or the second duration is associated with a first subcarrier spacing, the first subcarrier spacing is a minimum subcarrier spacing in the subcarrier spacings of the more than one carrier, the first duration is a duration for processing a downlink signal, and the second duration is a duration for preparing an uplink signal.

* * * * *

UNITED STATES PATENT AND TRADEMARK OFFICE
CERTIFICATE OF CORRECTION

PATENT NO. : 11,838,885 B2  
APPLICATION NO. : 17/986466  
DATED : December 5, 2023  
INVENTOR(S) : Shao et al.

Page 1 of 1

It is certified that error appears in the above-identified patent and that said Letters Patent is hereby corrected as shown below:

In the Specification

In Column 6, Line 6, delete "(i)" and insert -- (1) --.

In Column 11, Line 43, delete "wo" and insert -- 100 --.

In Column 13, Line 59, delete "$16T_s$" and insert -- $16T_s.$ --.

In Column 19, Line 39, delete "μDL" and insert -- $\mu_{DL}$ --.

In Column 22, Line 56, delete "(i)" and insert -- (1) --.

Signed and Sealed this  
Twenty-seventh Day of February, 2024

Katherine Kelly Vidal  
*Director of the United States Patent and Trademark Office*